US012752843B2

(12) United States Patent
Xiao et al.

(10) Patent No.: US 12,752,843 B2
(45) Date of Patent: Oct. 6, 2026

(54) EMU BOGIE AND RUBBER-TIRED TRAIN

(71) Applicant: CRRC NANJING PUZHEN CO., LTD., Nanjing (CN)

(72) Inventors: Yao Xiao, Nanjing (CN); Xiaoguang Ma, Nanjing (CN); Xiangyang Tai, Nanjing (CN); Jun Jiang, Nanjing (CN); Zhijun Tang, Nanjing (CN); Baolin Yang, Nanjing (CN)

(73) Assignee: CRRC NANJING PUZHEN CO., LTD. (CN)

( * ) Notice: Subject to any disclaimer, the term of this patent is extended or adjusted under 35 U.S.C. 154(b) by 525 days.

(21) Appl. No.: 17/913,318

(22) PCT Filed: Oct. 14, 2021

(86) PCT No.: PCT/CN2021/123695
§ 371 (c)(1),
(2) Date: Sep. 21, 2022

(87) PCT Pub. No.: WO2022/116699
PCT Pub. Date: Jun. 9, 2022

(65) Prior Publication Data

US 2024/0010271 A1 Jan. 11, 2024

(30) Foreign Application Priority Data

Dec. 4, 2020 (CN) ......................... 202011399101.2

(51) Int. Cl.
*B62D 7/04* (2006.01)
*B62D 7/20* (2006.01)
*B62D 47/02* (2006.01)

(52) U.S. Cl.
CPC ................. *B62D 7/04* (2013.01); *B62D 7/20* (2013.01); *B62D 47/025* (2013.01)

(58) Field of Classification Search
CPC .. B62D 7/04; B62D 7/20; B62D 13/00; B61F 5/08; B61F 5/386; B61F 5/52; Y02T 30/00; E02F 9/123
(Continued)

(56) References Cited

U.S. PATENT DOCUMENTS

2013/0312634 A1* 11/2013 Smit ....................... B61F 5/386 29/401.1
2018/0281825 A1* 10/2018 Dede ......................... B61F 5/52

FOREIGN PATENT DOCUMENTS

CN 107697157 A * 2/2018 ............. B62D 13/00
CN 107856695 A * 3/2018 ................ B61F 5/38
(Continued)

*Primary Examiner* — Valentin Neacsu
*Assistant Examiner* — Morgan Knauf

(57) ABSTRACT

An EMU bogie and a rubber-tired train are disclosed. The EMU bogie comprises a framework, a first EMU wheelset, a second EMU wheelset and an EMU steering driving device, the framework comprises two side beams opposite to each other and cross beams connected to the two side beams; the first EMU wheelset comprises a first axletree, a first EMU wheel and a second EMU wheel which are arranged at two ends of the first axletree; the second EMU wheelset comprises a second axletree, and a third EMU wheel and a fourth EMU wheel which are arranged at two ends of the second axletree; and the EMU steering driving, device comprises a driving part and a transmission part connected to the driving part, the first EMU wheelset and the second EMU wheelset, and is used for transmitting the steering power to the first EMU wheelset and the second EMU wheelset.

9 Claims, 17 Drawing Sheets

(58) Field of Classification Search
USPC ........................................................... 180/6.6
See application file for complete search history.

(56) References Cited

FOREIGN PATENT DOCUMENTS

| | | | | | |
|---|---|---|---|---|---|
| CN | 108263415 | A | * | 7/2018 | ................ B61F 5/52 |
| CN | 106585306 | B | * | 1/2019 | ............... B62D 7/20 |
| CN | 110525152 | A | * | 12/2019 | ............... B60G 3/20 |
| WO | WO-2017219555 | A1 | * | 12/2017 | ................ B61F 5/52 |

* cited by examiner

EMU BOGIE AND RUBBER-TIRED TRAIN

FIELD

The application relates to vehicle manufacturing technologies, in particular to an EMU bogie and a rubber-tired train.

BACKGROUND

With the development of urban transportation construction, articulated trains (such as traditional low-floor trams, traditional trolleybuses, urban BRT trains, etc.) have been put into use to alleviate the road traffic pressure. An articulated train is a wheeled train consisting of two or more carriages connected by hinges, and the direction of the articulated train is changed by the guidance of the hinges between the carriages.

In the articulated train, a steering system is used to control the moving direction of the train. The steering system should be able to keep the train running stably and flexibly change the moving direction as required. However, the articulated train is generally composed of two or more carriages, and the overall length of the train is large, so the turning radius is very large, leading to inflexible driving and turning on urban roads, which greatly limits the popularization and use of articulated trains.

SUMMARY

Embodiments of the application provide an EMU bogie and a rubber-tired train. The EMU bogie in the embodiments of the application can control the steering of two EMU wheelsets at the same time through one EMU steering driving device, thus ensuring the steering flexibility of an EMU body connected to the EMU bogie.

According to a first aspect of the embodiments of the application, an EMU bogie is provided, comprising:

- a framework which comprises two side beams opposite to each other and cross beams connected to the two side beams;
- a first EMU wheelset which comprises a first axletree, and a first EMU wheel and a second EMU wheel which are arranged at two ends of the first axletree, the first axletree being connected to first ends, of the two side beams;
- a second EMU wheelset which comprises a second axletree, and a third EMU wheel and a fourth EMU wheel which are arranged at two ends of the second axletree, the second axletree being connected to second ends of the two side beams; and
- an EMU steering driving device which comprises a driving part and a transmission part, the driving part being used for providing steering power, and the transmission part being connected to the driving part, the first EMU wheelset and the second EMU wheelset, and being used for transmitting the steering power provided by the driving part to the first EMU wheelset and the second EMU wheelset.

According to a second aspect of the embodiments of the application, a rubber-tired train is provided, comprising:

- a first vehicle body; and
- a second vehicle body opposite to the first vehicle body, the EMU bogie as described above being arranged on a side, backing onto the second vehicle body, of the first vehicle body, and the first vehicle body and the second vehicle body being connected by a trailer bogie.

According to the EMU bogie and the rubber-tired train provided by the embodiments of the application, the EMU bogie comprises a framework, a first EMU wheelset, a second EMU wheelset and an EMU steering driving device, wherein the framework comprises two side beams opposite to each other and cross beams connected to the two side beams; the first EMU wheelset comprises a first axletree, and a first EMU wheel and a second EMU wheel which are arranged at two ends of the first axletree, and the first axletree is connected to first ends of the two side beams; the second EMU wheelset comprises a second axletree, and a third EMU wheel and a fourth EMU wheel which are arranged at two ends of the second axletree, and the second axletree is connected to second ends of the two side beams; and the EMU steering driving device comprises a driving part and a transmission part, the driving part is used for providing steering power, and the transmission part is connected to the driving part, the first EMU wheelset and the second EMU wheelset, and is used for transmitting the steering power provided by the driving part to the first EMU wheelset and the second EMU wheelset. The EMU bogie in the embodiments of the application can control the steering of two EMU wheelsets at the same time through one EMU steering driving device, thus ensuring the steering flexibility of an EMU body connected to the EMU bogie.

BRIEF DESCRIPTION OF THE DRAWINGS

The drawings described herein are used to provide a further understanding of the application and constitute a part of the application. The illustrative embodiments and descriptions of the application are used to explain the application, and do not constitute an improper limitation of the application. In the drawings.

DESCRIPTION OF REFERENCE NUMERALS

Figure 1:
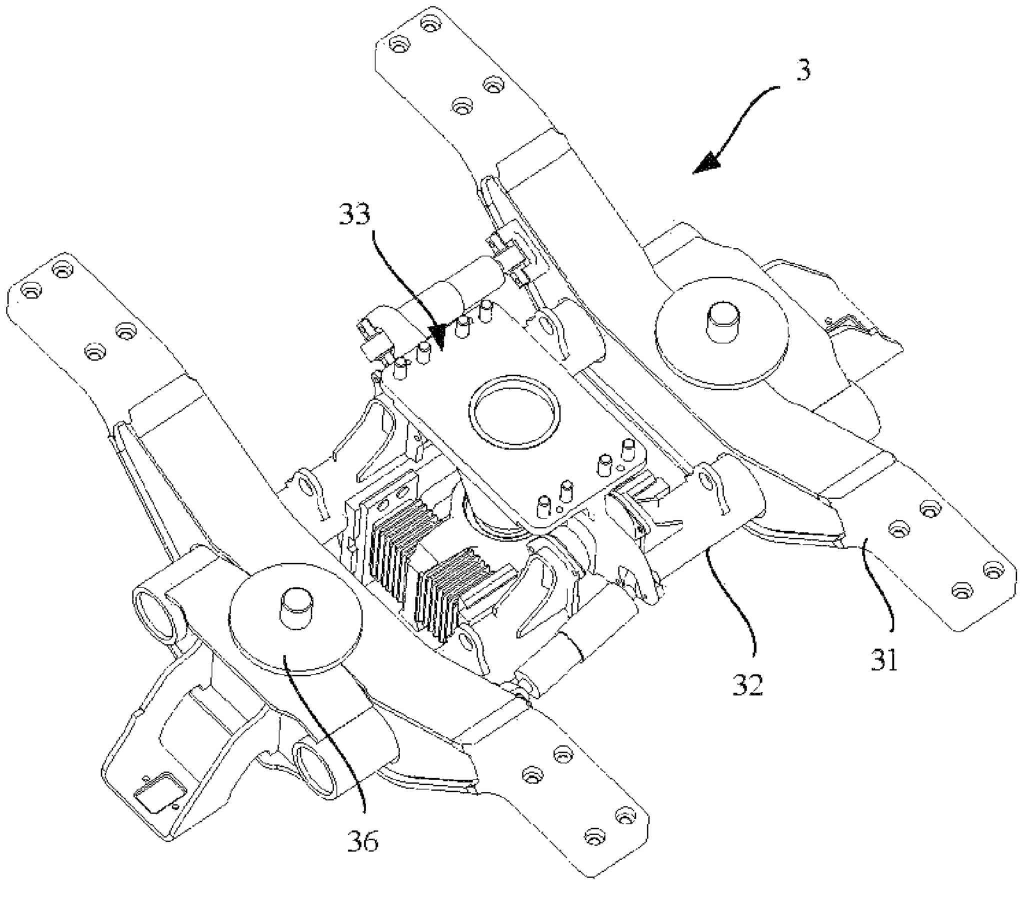
FIG. 1 is a structural diagram of an EMU bogie provided by an embodiment of the application.

1153—first vehicle body traction rod base; 1154—second vehicle body traction rod base;

3—EMU bogie;

31—side beam;

32—cross beam; 321—longitudinal stop bearing plate;

33—EMU traction device; 331—traction center pin; 3311—traction pin mounting plate; 3312—stepped shaft; 3313—traction pin limit lug; 33131—vibration absorber mounting groove; 33132—limit plane; 332—traction module; 333—longitudinal stopper; 334—lateral stopper; 3341—lateral stop mounting base; 3342—lateral stop block; 335—center pin connector; 336—traction pin mounting base;

34—EMU steering driving device; 342—power steering gear; 343—power steering swing arm; 3441—power steering drawbar; 3442—first transmission rod; 3443—second transmission rod; 3444—third transmission rod; 3451—first tire steering swing arm; 3452—second tire steering swing arm; 3453—third tire steering swing arm; 3454—fourth tire steering swing arm; 346—limit switch; 347—first drive axle; 348—second drive axle; 349—booster cylinder;

351—first EMU wheelset; 3511—First EMU wheel; 3512—second EMU wheel; 3513—limit stopper;

352—second EMU wheelset; 3521—third EMU wheel; 3514—fourth EMU wheel;

36—secondary suspension device;

37—EMU traction driving device; 371—traction motor; 372—drive axle; 373—transmission shaft;

3731—first transmission part; 3732—second transmission pare 3733—third transmission part; 374—traction motor mounting base; 375—traction motor support base

38—lateral vibration absorber;

4—trailer bogie;

41—first frame; 411—first frame hinging part; 412—first frame connecting part; 413—first buffer base mounting arm;

42—first axle; 4201—first trailer wheel;

43—second frame; 431—second frame hinging part; 432—second frame connecting part; 433—second buffer base mounting arm;

44—second axle; 441—first axle traction rod base; 442—second axle traction rod base; 4401—second trailer wheel;

45—slewing support device; 451—slewing bearing; 4511—first rotator; 4512—second rotator; 452—slewing support cover plate; 4521—through passage limit boss; 4522—withdrawal threaded hole; 4523—elastic pin mounting hole; 4524—cover plate fastener mounting hole; 453—waterproof pad; 454—elastic pin; 455—sealing plug; 456—cover plate fastener;

46—trailer traction device;

461—first traction component; 4611—first traction rod; 4612—first traction rod node; 4613—height valve rod mounting base; 462—second traction component; 4621—second traction rod; 4622—second traction rod node;

47—frame buffer device; 471—first buffer block mounting base; 472—first buffer block; 473—second buffer block mounting base; 474—second buffer block;

481—first steering driving device; 4811—first servo motor; 4812—first power steering gear; 4813—first coupling; 4814—first power steering swing arm; 4815—first longitudinal drawbar; 4816—first trailer steering swing arm; 48161—first trailer sub-swing arm; 48162—second trailer sub-swing arm; 4817—first lateral drawbar; 4818—first mounting base; 4819—first limit switch;

482—second steering driving device; 4821—second servo motor; 4822—second power steering gear; 4823—second coupling; 4824—second power steering swing arm; 4825—second longitudinal drawbar; 4826—second trailer steering swing arm; 48261—third trailer sub-swing arm; 48262—fourth trailer sub-swing arm; 4827—second lateral drawbar; 4828—second mounting base; 4829—second limit switch;

49—air spring; 491—upper spring cover plate; 492—air bag; 493—limit stop cover; 4931—stop cover body; 4932—stop cover limit plate; 4933—stop cover mounting edge; 494—limit stopper; 4941—limit stop block; 4942—limit stop connecting rod; 495—flat rubber-metal pad; 496—limit stop mounting plate; 497—spring lower cover plate.

DETAILED DESCRIPTION

In order to make the technical scheme and advantages of the embodiments of this application clearer, exemplary embodiments of the application will be described in detail below with reference to the attached drawings. Obviously, the described embodiments are only illustrative ones, and are not all possible ones of the application. It should be noted that the embodiments in this application and the features in the embodiments can be combined with each other without conflict.

Embodiment 1

Figure 2:
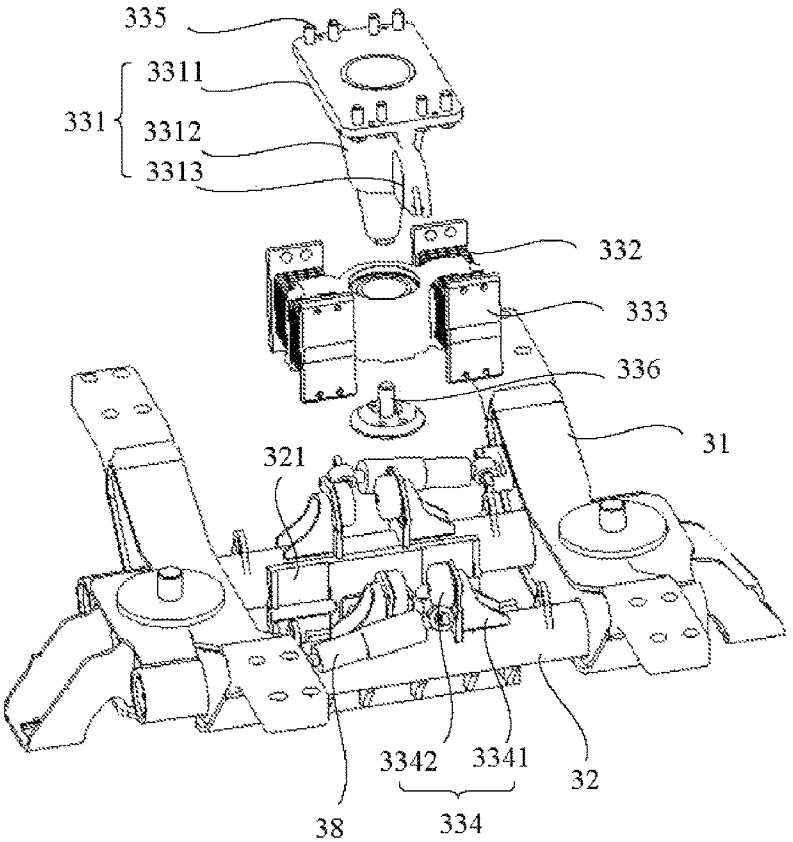
FIG. 2 is a diagram of a connection structure between an EMU traction device and a framework provided by an embodiment of the application.

FIG. 1 is a structural diagram of an EMU bogie provided by an embodiment of the application, and FIG. 2 is a diagram of a connection structure between an EMU traction device and a framework provided by an embodiment of the application. Please refer to FIGS. 1-2.

This embodiment provides an EMU bogie 3, which comprises a framework, a traction center pin 331 and an EMU traction device 33, wherein the framework is a mounting foundation of the EMU traction device 33 and the traction center pin 331, and the framework comprises two side beams 31 and two cross beams 32; the two side beams 31 extend in the length direction of a vehicle body, and the two side beams 31 are parallel and opposite to each other, and are located at the edges of the framework respectively; and the two cross beams 32 extend in the width direction of the vehicle body, the two cross beams 32 can be oppositely arranged between the two side beams 31 in parallel, and two ends of each cross beam 32 are fixedly connected to the side beams 31 respectively. The EMU bogie 3 of this embodiment further comprises a first EMU wheelset 351 and a second EMU wheelset 352, the first EMU wheelset 351 comprises a first axletree, and a first EMU wheel 3511 and a second EMU wheel 3512 which are arranged at two ends of the first axletree, and the first axletree is connected to first ends of the two side beams 31; and the second EMU wheelset 352 comprises a second axletree, and a third EMU wheel 3521 and a fourth EMU wheel 3514 which are arranged at two ends of the second axletree, and the second axletree is connected to second ends of the two side beams 31.

In this embodiment, an insertion space of the EMU traction device 33 is formed between the two cross beams 32, that is, the EMU traction device 33 is installed on the two cross beams 32, and the traction force generated by a traction module 332 can be transmitted to the framework through the cross beams 32. The EMU traction device 33 and a secondary suspension device 36 on the side beams 31 are jointly connected to an EMU body above.

Specifically, the EMU traction device 33 comprises the traction module 332 and a traction center pin 331. The traction module 332 is used for fixing the traction center pin 331, and can transmit the traction force on the traction center pin 331 to the cross beams 32, and make a vehicle move forward or backward. As an example, two sides of the traction module 332 facing the cross beams 32 are respectively provided with longitudinal stoppers 333, and the traction module 332 is fixedly mounted on the cross beams 32 through the longitudinal stoppers 333. A middle area of the traction module 332 is provided with an insertion hole for mounting the traction center pin 331, and a top of the traction center pin 331 is connected to the vehicle body, that is, the traction center pin 331 is connected to the vehicle body and the traction module 332, and the traction module 332 is fixedly connected to the cross beams 32.

The traction center pin 331 comprises a traction pin body, a top of which is provided with a center pin connector 335 at a side facing the vehicle body, and the traction center pin 331 is connected to the vehicle body through the center pin connector 335. The traction pin body is matched with the insertion hole of the traction module 332, and the traction pin body can be inserted into the insertion hole of the traction module 332 to transmit the traction force acting on the traction center pin 331 to the cross beams 32.

Each traction center pin 331 can be provided with two traction pin limit lugs 3313, which are respectively located at two sides of the traction pin body, and the traction pin limit lugs 3313 are located at a side, facing the cross beams 32, of the traction pin body. In the length direction of the cross beams 32, two lateral stoppers 334 are arranged in middle areas of the cross beams 32, and the two lateral stoppers 334 are spaced apart and oppositely arranged on the cross beams 32, so that a limit space of the traction pin limit lugs 313 is formed between the two lateral stoppers 334, which allows an edge of an end of the traction pin limit lug 313 away from the traction pin body to be limited therein, and when the traction center pin 331 is in a free state, the traction pin limit lug 3313 has a moving clearance with the lateral stoppers 334 on two sides. When the traction center pin 331 transmits the traction force, the two lateral stoppers 334 can limit the lateral displacement of the traction center pin 331, and meanwhile, the traction center pin 331 can rotate relative to the EMU bogie 3.

In the EMU bogie 3 provided in this embodiment, the traction center pin 331 is fixed on the traction module 332, the traction module 332 is fixed between the two cross beams 32 through the longitudinal stoppers 333, and the traction force of the traction center pin 331 is transmitted to the cross beams 32, so that the vehicle can move forward or backward. In addition, the edge of the traction limit lug of the traction center pin 331 is embedded between the two lateral stoppers 334, and a moving clearance exists; and the traction center pin 331 can rotate relative to the EMU bogie 3 within a certain rotation range, thereby improving the curve passing performance of the vehicle.

Further, the traction module 332 provided in this embodiment has a non-rigid component with a certain rigidity, which is used for transmitting the traction force and braking force between the traction center pin 331 and the vehicle. The traction module 332 has a large contact surface, and there is no gap between elastic elements and no sudden change in the force transmission process, so the force is applied more uniformly. The traction, module 332 is under pre-pressure when assembled, and the force changes little during traction and braking.

On the basis of the above embodiment, the traction pin body comprises a traction pin mounting plate 3311 and a stepped shaft 3312, wherein the traction pin mounting plate 3311 is located at a top of the traction pin body, one side of the traction pin mounting plate 3311 is fixedly connected to the vehicle body, and the traction pin connector connected to the vehicle body is located on a side, facing the vehicle body, of the traction pin mounting plate 3311.

The stepped shaft 3312 and the two traction pin limit lugs 3313 are located on a side, backing onto the vehicle body, of the traction pin mounting plate 3311, that is, the stepped shaft 3312 and the traction pin limit lugs 3313 are located below the traction pin mounting plate 3311. The stepped shaft 3312 comprises a large-diameter section and a small-diameter section. The stepped shaft 3312 is fixed on the traction pin mounting plate 3311 through its large-diameter section, and both the large-diameter section and the small-diameter section are inserted into the traction module 332. The two traction limit lugs are respectively located on two sides of the stepped shaft 3312, and are symmetrical with respect to the stepped shaft 3312, and one side of each traction limit lug is fixed on the large-diameter section of the stepped shaft 3312. Meanwhile, the sides, facing the traction pin mounting plate 3311, of the traction limit lugs are fixed on the traction pin mounting plate 3311. It can be understood that the traction pin mounting plate 3311, the stepped shaft 3312 and the two traction limit lugs may be of an integrated structure to enhance the structural strength of the traction center pin 331.

A center of the traction module 332 is provided with an insertion hole allowing the stepped shaft 3312 to be inserted therein, and a bottom of the traction module 332 is provided with a traction pin mounting base 336, which comprises a blocking plate and a positioning column arranged on the blocking plate. The blocking plate can be fixed to the bottom of the traction module 332 by bolts, and the blocking plate seals the insertion hole. After the blocking plate is fixed to the bottom of the traction module 332, the positioning column arranged on the blocking plate can extend into the insertion hole. The traction center pin 331 is provided with a positioning hole matched with the positioning column, the positioning hole can be located in the small-diameter section of the stepped shaft 3312, and the positioning hole is in clearance fit with the positioning column to position the traction center pin 331, so as to connect the traction center pin 331 to the positioning column through insertion.

It can be understood that the stepped shaft 3312 of the traction center pin 331 is in clearance fit with the insertion hole of the traction module 332, and a side face of the stepped shaft 3312 is attached to a hole wall of the insertion hole, which can be realized in a cone-shaped close fitting manner. In this way, after the traction module 332 is tightly connected to the traction center pin 331, the traction module 332 can move along with the traction center pin 331, and a stable connection state is maintained, thus ensuring good force transmission.

On the basis of the above embodiment, in order to fix the traction module 332 between the two cross beams 32, the traction module 332 is provided with longitudinal stoppers 333 on two sides facing the cross beams 32, and each beam 32 is provided with a longitudinal stop bearing plate 321 on a side facing the traction module 332. The longitudinal stop bearing plate 321 is matched with and fixedly connected to the longitudinal stopper 333, so that the traction force on the traction module 332 can be transmitted to the longitudinal stop bearing plate 321 through the longitudinal stopper 333, and then transmitted to the cross beam 32 by the longitudinal stop bearing plate 321. In this way, the connection area between the traction module 332 and the cross beam 32 is increased, and the traction force on the traction module 332 can be stably transmitted to the cross beam 32.

Further, in this embodiment, two longitudinal stoppers 333 are arranged on one side of the traction module 332, and the two longitudinal stoppers 333 are symmetrically arranged on the traction module 332. A receding space is formed between the two longitudinal stoppers 333, and the two lateral stoppers 334 can be located in the receding space. Correspondingly, one sides of the cross beams 32 facing the traction module 332 are provided with two longitudinal stop bearing plates 321, and the two longitudinal stop bearing plates 321 are symmetrically arranged on the cross beams 32. The two lateral stoppers 334 are located between the two longitudinal stop bearing plates 321, which facilitates the connection and fixation of the longitudinal stoppers 333 and the longitudinal stop bearing plates 321, and also facilitates the restriction of the traction center pin 331 between the two lateral stoppers 334.

Figure 3:
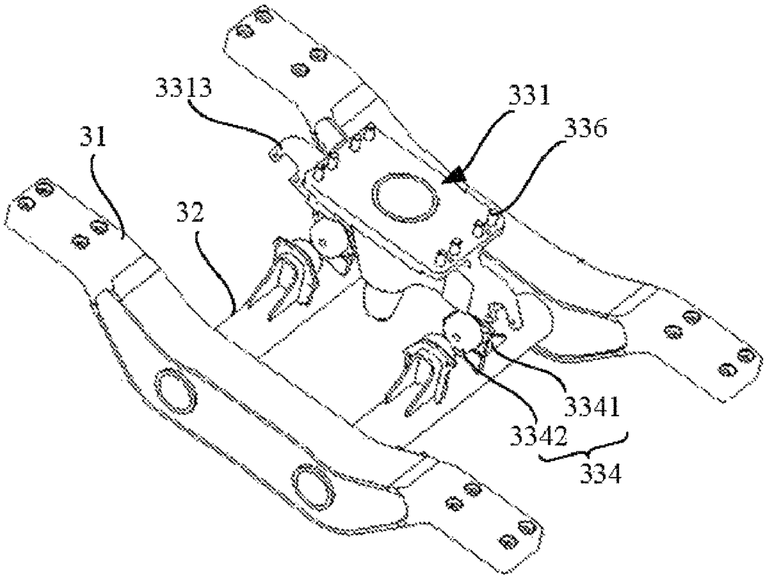
FIG. 3 is a diagram of a connection structure between a traction center pin and a framework provided by an embodiment of the application.
Figure 4:
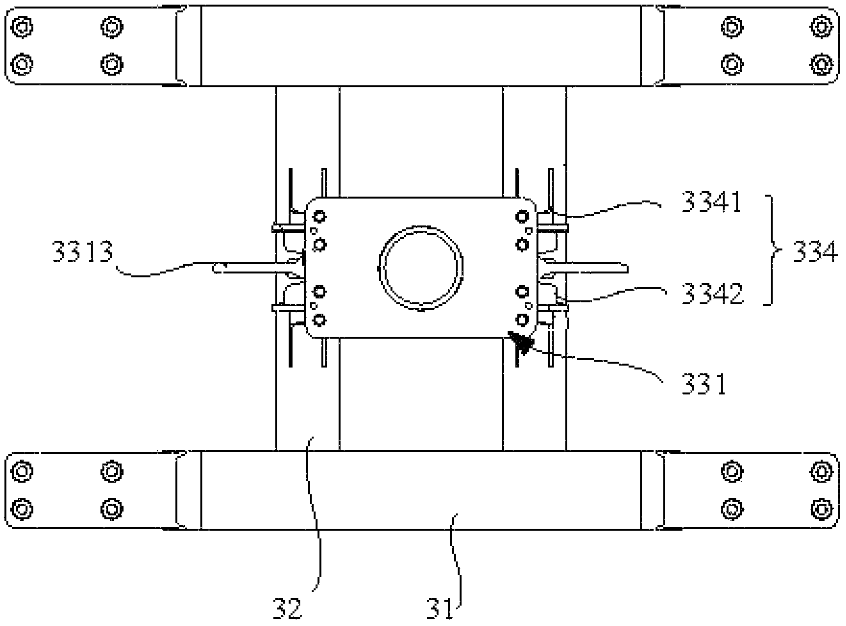
FIG. 4 is atop view of FIG. 3.

FIG. 3 is a diagram of a connection structure between a traction center pin and a framework provided by an embodiment of the application, and FIG. 4 is atop view of FIG. 3. Please refer to FIGS. 3-4. The lateral stopper 334 provided in this embodiment comprises a lateral stop mounting base 3341 and a lateral stop block 3342, wherein the lateral stop mounting base 3341 is fixed on the cross beam 32, and the lateral stop block 342 is fixed at a top end of the lateral stop mounting base 3341. The lateral stop blocks 3342 on the two lateral stoppers 334 on the same cross beam 32 are oppositely arranged, and a certain gap exists between the two lateral stoppers 342. When the traction center pin 331 is inserted into the traction module 332, the traction pin limit lugs 3313 of the traction center pin 331 are embedded between the two lateral stop blocks 3342, that is, the two lateral stop blocks 3342 are located on two sides of the traction pin limit lugs 3313 respectively in a clamping mode.

Figure 5:
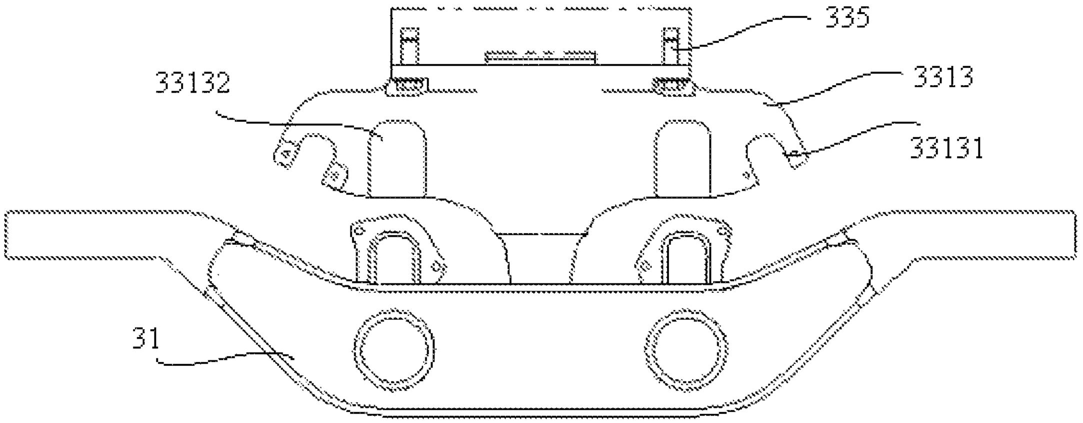
FIG. 5 is a side view of FIG. 3.

FIG. 5 is a side view of FIG. 3. Please refer to FIG. 5. In order to improve the abutment effect between the lateral stop block 3342 and the traction pin limit lug 3313, the traction pin limit lug 3313 is provided with a limit plane 33132 on a side facing, the lateral stop block 3342. Of course, the lateral stop block 3342 is also provided with an abutment plane on a side facing the traction pin limit lug 3313. When the lateral stopper 334 abuts against the traction pin limit lug 3313, the lateral stop block 3342 and a limit block can be attached to each other through the limit plane 33132 and the abutment plane, which increases the contact area between the lateral stop block 3342 and the traction pin limit lug 313, thus improving the abutment effect between the traction center pin 331 and the lateral stopper 334.

Still refer to FIG. 1, the EMU bogie 3 provided in this embodiment further comprises lateral vibration absorbers 38, one end of which is connected to the side beam 31, and the other end is connected to the traction pin limit lug 3313. The lateral vibration absorber 38 can reduce the lateral vibration amplitude of the traction center pin 331. It can be understood that the lateral vibration absorber 38 can be obliquely arranged between the traction pin limit lug 3313 and the side beam 31, and the lateral vibration absorber 38 gradually inclines outward in the direction from the traction pin limit lug 3313 to the side beam 31, so as to improve the lateral damping effect of the lateral vibration absorber 38.

Referring to FIG. 5 and FIG. 1, in order to connect the traction center pin 331 to the lateral vibration absorber 38, in this embodiment, after the traction pin limit lugs 3313 are embedded between the two lateral stoppers 334, part of the traction pin limit lugs 3313 can protrude out of the lateral stoppers 334, so as to connect the traction pin limit lugs 3313 with the lateral vibration absorbers 38. Specifically, in this embodiment, a vibration absorber mounting groove 33131 is formed in a part, protruding out of the lateral stopper 334, of the traction pin limit lug 3313, one end of the lateral vibration absorber 38 passes through the mounting groove, and a rod part of the lateral vibration absorber 38 is embedded in the vibration absorber mounting groove 33131. After the end of the lateral vibration absorber 38 passes through the vibration absorber mounting groove 33131, the end of the lateral vibration absorber 38 abuts against a side face of the traction pin limit lug 3313, thereby connecting the lateral vibration absorber 38 to the traction center pin 331.

Figure 6:
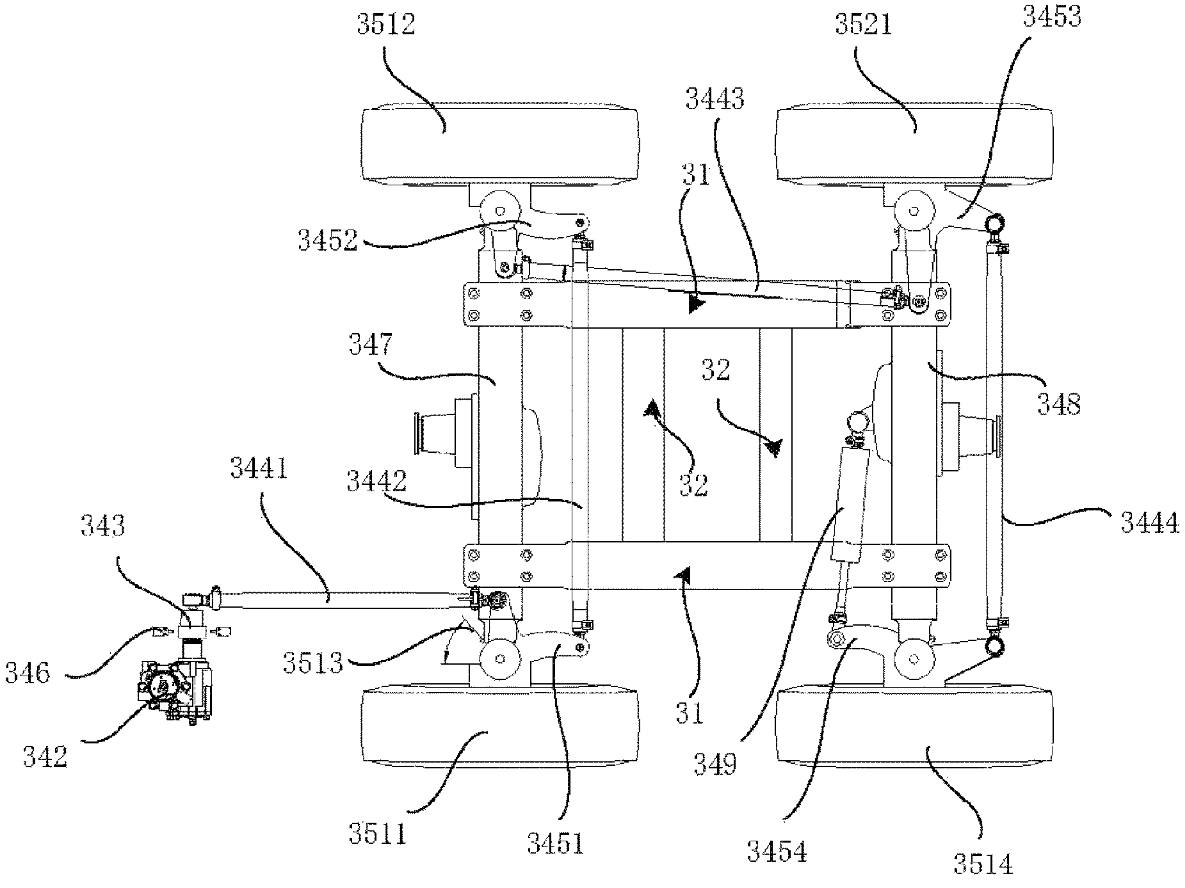
FIG. 6 is a diagram of a connection structure between an EMU steering driving device and a framework provided by an embodiment of the application.
Figure 7:
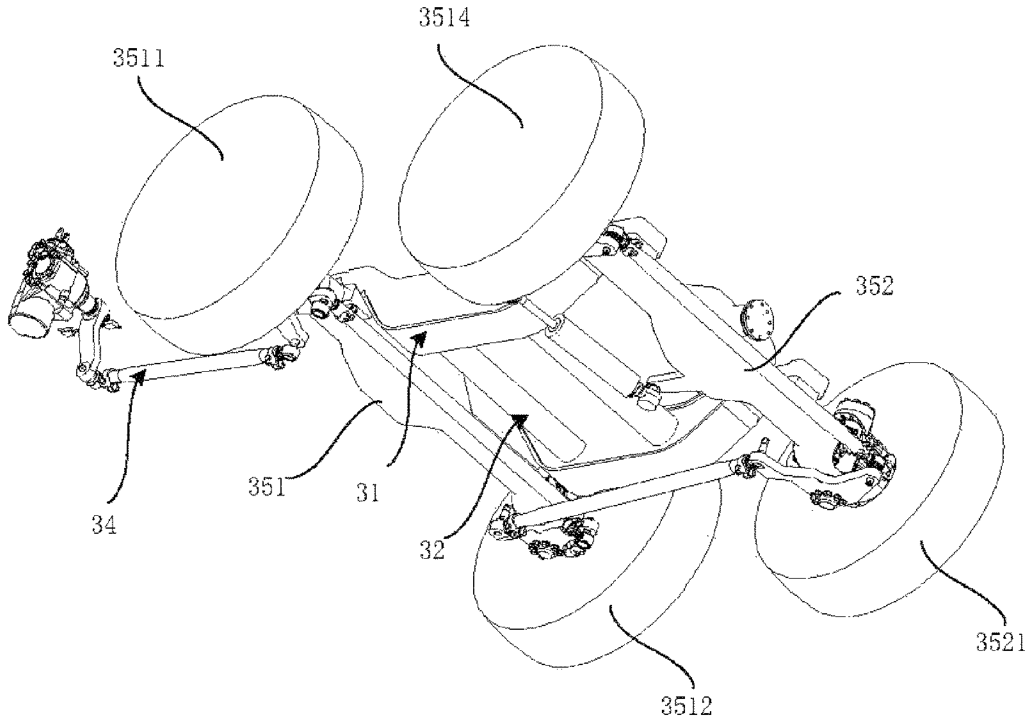
FIG. 7 is a structural diagram of FIG. 6 from another perspective.

FIG. 6 is a diagram of a connection structure between an EMU steering driving device and a framework provided by an embodiment of the application, and FIG. 7 is a structural diagram of FIG. 6 from another perspective. This embodiment provides an EMU bogie. Please refer to FIGS. 6-7.

The EMU bogie 3 of this embodiment further comprises an EMU steering driving device 34 for controlling the steering of the EMU bogie 3, wherein the EMU steering driving device 34 comprises a driving part and a transmission part, the driving part is used for providing steering power, and the transmission part is connected to the driving part, the first EMU wheelset 351 and the second EMU wheelset 352, and is used for transmitting the steering power provided by the driving part to the first EMU wheelset 351 and the second EMU wheelset 352.

The EMU steering driving device 34 of the EMU bogie in this embodiment can transmit the steering power to the first EMU wheelset 351 and the second EMU wheelset 352 at the same time, so that the steering of the first EMU wheelset 351 and the second EMU wheelset 352 can be simultaneously controlled by one EMU steering driving device 34, and the steering flexibility of the vehicle body connected to the EMU bogie can be ensured.

Please refer to FIG. 6, the driving part of this embodiment comprises a driving motor (not shown) and a power steering gear 342. The driving motor communicates with a controller, and the driving motor is used for outputting the steering force. An output end of the power steering gear 342 is connected to the transmission part, and the power steering gear 342 is used for changing the direction of the steering force output by the driving motor to provide the steering power for the transmission part.

The transmission part comprises a power steering swing arm 343, a power steering drawbar 3441, a first tire steering swing arm 3451, a second tire steering swing arm 3452, a third tire steering swing arm 3453 and a fourth tire steering swing arm 3454.

A first end of the power steering swing arm 343 is connected to the output end of the power steering gear 342 to receive the steering power output by the power steering gear 342.

A first end of the power steering drawbar 3441 is connected to a second end of the power steering swing arm 343, and is used for transmitting the steering power to the first EMU wheel 3511.

The first tire steering swing arm 3451 is fixedly connected to the first EMU wheel 3511. Optionally, the first tire steering swing arm 3451 can be fixed on a hub of the first EMU wheel 3511, so as to drive the first EMU wheel 3511 to rotate. The first tire steering swing arm 3451 comprises two first sub-swing arms, and a first included angle is formed between the two first sub-swing arms. A second end of the power steering drawbar 3441 is connected to one of the first sub-swing arms to receive the steering power transmitted by the power steering drawbar 3441.

The second tire steering swing, arm 3452 is fixedly connected to the second EMU wheel 3512. Optionally, the second time steering swing arm 3452 can be fixed on a hub of the second EMU wheel 3512, so as to drive the second EMU wheel 3512 to rotate. The second tire steering swing arm 3452 comprises two second sub-swing arms, and a second included angle is formed between the two second sub-swing arms. The other first sub-swing arm of the first tire steering swing arm 3451 is connected to one of the second sub-swing arms through a first transmission rod 3442 to transmit the steering power to the second EMU wheel 3512.

The third tire steering swing arm 3453 is fixedly connected to the third EMU wheel 3521. Optionally, the third tire steering swing arm 3453 can be fixed on a hub of the third EMU wheel 3521, so as to drive the third EMU wheel 3521 to rotate. The third tire steering swing, arm 3453 comprises two third sub-swing arms, and a third included angle is formed between the two third sub-swing arms. The other second sub-swing arm of the second tire steering swing arm 3452 is connected to one of the third sub-swing arms through a second transmission rod 3443 to transmit the steering power to the third EMU wheel 3521.

The fourth tire steering swing arm 3454 is fixedly connected to the fourth EMU wheel 3514. Optionally, the fourth tire steering swing arm 3454 can be fixed on a hub of the fourth EMU wheel 3514, so as to drive the fourth EMU wheel 3514 to rotate. The fourth tire steering swing arm 3454 comprises two fourth sub-swing arms, and a fourth included angle is formed between the two fourth sub-swing arms. The other third sub-swing arm of the third tire steering swing arm 3453 is connected to one of the fourth sub-swing arms through a third transmission rod 3444 to transmit the steering power to the fourth EMU wheel 3514.

With the above arrangement, this embodiment realizes simultaneous control of the steering of the first EMU wheelset 351 and the second EMU wheelset 352 by using one EMU steering driving device 34, thus ensuring the synchronization of steering of various parts of the vehicle body connected to the EMU bogie.

Optionally, please refer to FIG. 6, in this embodiment, the first included angle, the second included angle, the third included angle and the fourth included angle are the same or different, to meet the needs of different wheels for different deflection angles when passing through a curve.

Further, in this embodiment, the length of the power steering drawbar 3441, the length of the first transmission rod 3442, the length of the second transmission rod 3443 and the length of the third transmission rod 3444 are the same or different, and can be set according to transmission requirements specifically.

Optionally, please refer to FIG. 6, the power steering gear 342 of this embodiment is further provided with a limit switch 346, which is arranged on a side, facing the power steering swing arm 343, of the power steering gear 342, and the limit switch 346 communicates with the controller. When the power steering swing arm 343 contacts the limit switch 346, the limit switch 346 generates a signal and feeds the signal back to a Vehicle controller, which will issue an instruction to stop the EMU bogie from moving in this direction.

In addition, in this embodiment, the first axletree is sleeved with a first drive axle 347, and the first drive axle 347 is connected to the first ends of the two side beams 31. The second axletree is sleeved with a second drive axle 348, and the second drive axle 348 is connected to the second ends of the two side beams 31. The first drive axle 347 is connected to the second drive axle 348 through the framework, and the relative positions of the first drive axle 347 and the second drive axle 348 can be kept unchanged through fixed connection, so that the application basis of a deflection mechanism can be kept unchanged in the process of steering deflection.

Further, please refer to FIG. 6, two ends of the first axletree are respectively provided with limit stoppers 3513, and the limit stoppers 3513 are used for limiting the deflection angle of the first EMU wheel 3511. As a physical limit, the limit angle of the limit stopper 3513 can be adjusted in advance, which is the maximum deflection angle of the wheel.

Optionally, a middle of the second drive axle 348 is provided with a booster cylinder 349, which is connected to the other fourth sub-swing arm of the fourth tire steering swing arm 3454, and serves to strengthen and supplement the steering force.

Figure 8:
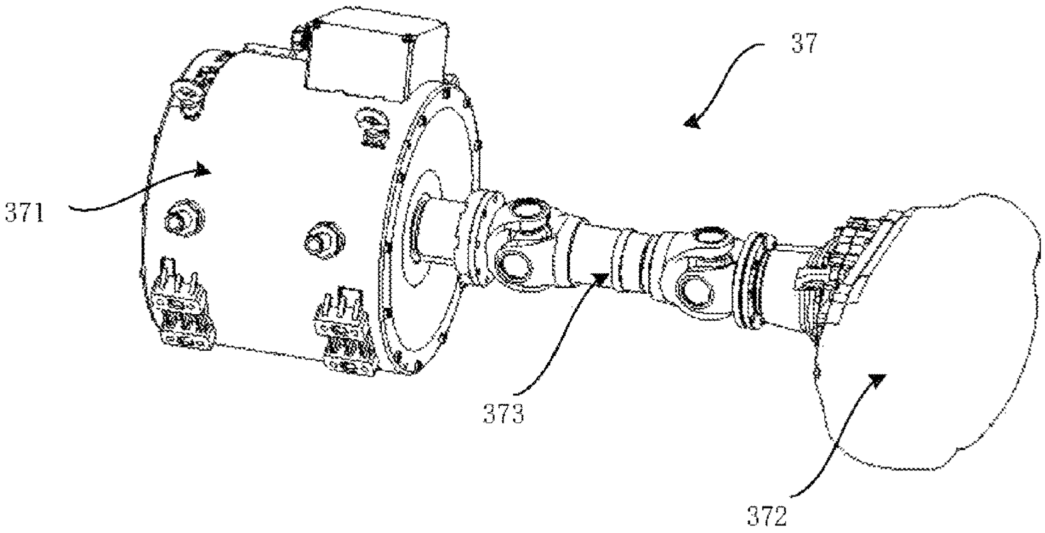
FIG. 8 is a structural diagram of an EMU traction driving device provided by an embodiment of the application.
Figure 9:
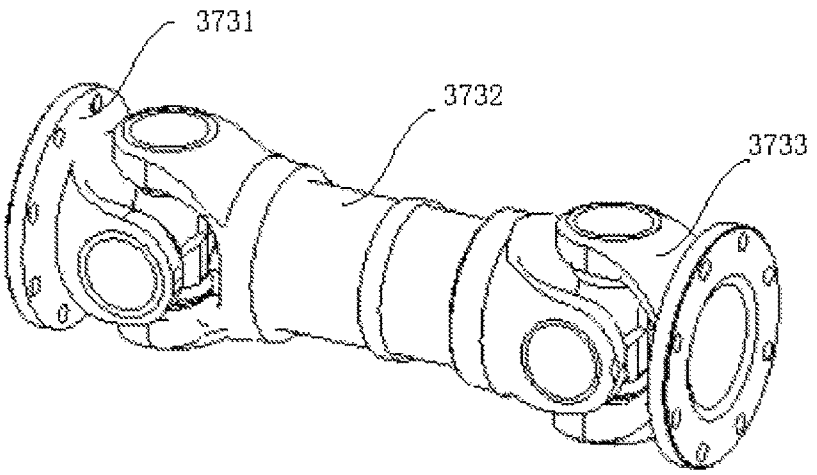
FIG. 9 is a structural diagram of a transmission shaft provided by an embodiment of the application.

FIG. 8 is a structural diagram of an EMU traction driving device provided by an embodiment of the application, and FIG. 9 is a structural diagram of a transmission shaft provided by an embodiment of the application. Please refer to FIGS. 8-9.

The EMU bogie 3 of this embodiment also comprises an EMU traction driving device 37, which is used for driving the EMU steering gear 3 to move along a straight line.

The EMU traction driving device 37 comprises a traction motor 371, a drive axle 372 and a transmission shaft 373. An output shaft of the traction motor 371 is used for outputting traction, an input end of the drive axle 372 is connected to the output shaft of the traction motor 371, and the drive axle 372 may be the first drive axle 347 or the second drive axle 348 mentioned above. An output end of the drive axle 372 is connected to a wheel to drive the wheel to rotate, so as to drive the EMU bogie 3 forward. Two ends of the transmission shaft 373 are fixedly connected to the output end of the traction motor 371 and the input end of the drive axle 372 respectively. The transmission shaft 373 comprises a first transmission part 3731, a second transmission part 3732 and a third transmission part 3733. A first end of the first transmission part 3731 is fixedly connected to the output shaft of the traction motor 371, a second end of the first transmission part 3731 is hinged to a first end of the second transmission part 3732, a second end of the second transmission part 3732 is hinged to a first end of the third transmission part 3733, and a second end of the third transmission part 3733 is fixedly connected to the input end of the drive axle 372.

In this embodiment, the two ends of the transmission shaft 373 are fixedly connected to the output end of the traction motor 371 and the input end of the drive axle 372 respectively, thus ensuring that the transmission shaft 373 can normally transmit the traction of the traction motor 371 to the drive axle 372. In addition, as the transmission shaft 373 itself comprises the first transmission part 3731, the second transmission part 3732 and the third transmission part 3733 which are hinged to each other, two adjacent transmission parts can move relatively, so that when a height difference between the motor and the drive axle 372 is caused by various working conditions, the transmission shaft 373 can well adapt to the height difference and normally transmit torque, fulfilling a good traction effect.

Optionally, please refer to FIGS. 8-9, in this embodiment, the second end of the first transmission part 3731 is provided with a first hinging base, the first end of the second transmission part 3732 is provided with a first hinging hole, and the axial direction of the first hinging hole is perpendicular to the extension direction of the second transmission part 3732. A first ball bearing is connected to the first hinging hole and the first hinging base to hinge the second end of the first transmission part 3731 to the first end of the second transmission part 3732. In this embodiment, a rubber node is arranged in the first hinging base, so that a certain deformation can be generated with the rotation of the second transmission part 3732 to reduce the impact force generated during rotation.

The second end of the second transmission part 3732 is provided with a second hinging base, the first end of the third transmission part 3733 is provided with a second hinging hole, and the axial direction of the second hinging hole is perpendicular to the extension direction of the second transmission part 3732. A second ball bearing is connected to the second hinging hole and the second hinging base to hinge the second end of the second transmission part 3732 to the first end of the third transmission part 3733. In this embodiment, a rubber node is arranged in the second hinging base, so that a certain deformation can be generated with the rotation of the second transmission part 3732 to reduce the impact force generated during rotation.

Further, in this embodiment, the first end of the first transmission part 3731 is provided with a first fixing base, which is provided with a plurality of first fixing holes, and the output shaft of the traction motor 371 is provided with a first connecting base, which is provided with a plurality of first connecting holes matched with the first fixing holes. After passing through the first fixing holes and the first connecting holes, a first fastener fixedly connects the first end of the first transmission part 3731 with the output shaft of the traction motor 371.

The second end of the third transmission part 3733 is provided with a second fixing base, which is provided with a plurality of second fixing holes, and the input end of the drive axle 372 is provided with a second connecting base, which is provided with a plurality of second connecting holes matched with the second fixing holes. After passing through the second fixing holes and the second connecting holes, a second fastener fixedly connects the second end of the third transmission part 3733 with the output shaft of the traction motor 371.

Optionally, the first fastener and the second fastener each comprise a bolt and a nut, and the bolt is connected to and fixed by the nut after passing through the connecting holes and the fixing holes.

Figure 10:
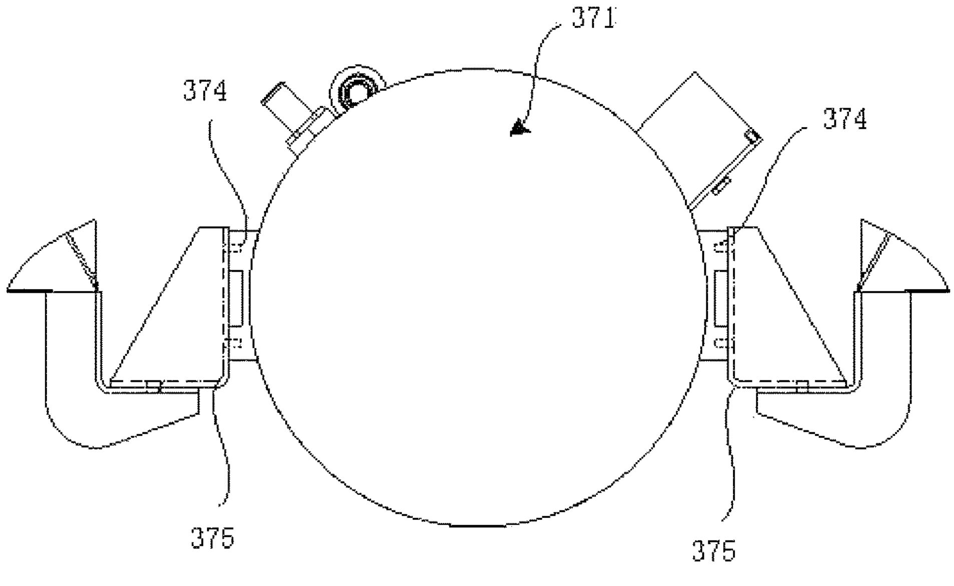
FIG. 10 is a diagram of a connection structure between a traction motor and a vehicle body provided by an embodiment of the application.

FIG. 10 is a diagram of a connection structure between a traction motor and a vehicle body provided by an embodiment of the application. Referring to FIG. 10 in this embodiment, the traction motor 371 is fixed on the vehicle body of a rubber-tired train. Specifically, the traction motor 371 is provided with a traction motor mounting base 374, which is connected to the vehicle body of the rubber-tired train.

Optionally, the traction motor 371 is provided with two traction motor mounting bases 374, and the two traction motor mounting bases 374 are symmetrically arranged on two sides of the traction motor 371. The two traction motor mounting bases 374 are connected to the vehicle body through two traction motor support bases 375 respectively.

The traction motor support base 375 comprises a first support plate and a second support plate, the first support plate is Vertically connected to one end of the second support plate, the first support plate is fixedly connected to the traction motor mounting, base 374 through bolts, welding, etc., and the second support plate is fixedly connected to the vehicle body through bolts, welding, etc.

Embodiment 2

This embodiment provides a rubber-tired train which comprises a first vehicle body and a second vehicle body which are oppositely, arranged. A side, backing onto the second vehicle body, of the first vehicle body is provided with the EMU bogie as described in Embodiment 1, and the first vehicle body and the second vehicle body are connected by a trailer bogie. Obviously, in this embodiment, the first vehicle, body is an EMU body, and the second vehicle body may be an intermediate vehicle body or an EMU body.

Because the rubber-tired train of this embodiment is provided with the EMU bogie as described in Embodiment 1, the steering of the first EMU wheelset and the second EMU wheelset can be controlled at the same time through one EMU steering driving device, thus ensuring the steering flexibility of the vehicle body connected to the EMU bogie.

Figure 11:
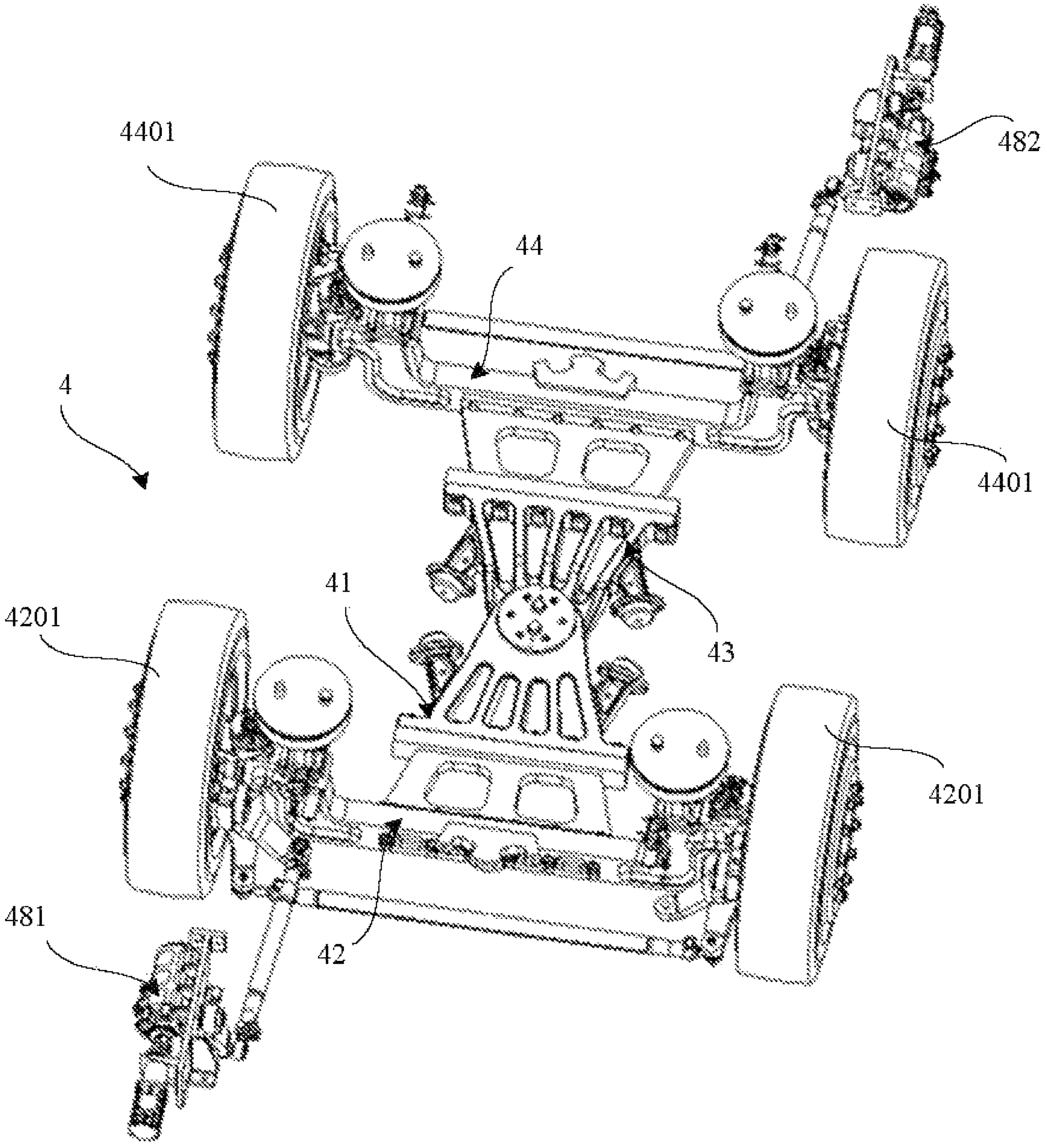
FIG. 11 is a structural diagram of a trailer bogie provided by an embodiment of the application.

Further, FIG. 11 is a structural diagram of a trailer bogie provided by an embodiment of the application. Please refer to FIG. 11. The trailer bogie 4 of this embodiment is mounted under the two adjacent first and second vehicle bodies, not only for bearing the first and second vehicle bodies, but also for transmitting the traction between the first and second vehicle bodies.

Specifically, the trailer bogie 4 comprises a first frame 41 and a second frame 43. The first frame 41 is connected to the first vehicle body, and the second frame 43 is connected to the second vehicle body.

A first end of the first frame 41 is hinged to the second frame 43. A second end of the first frame 41 is provided with a first axle 42, the extending direction of which is perpendicular to that of the first frame 41, and two ends of the first axle 42 are connected to first trailer wheels 4201.

A first end of the second frame 43 is hinged to the first, frame 41. A second end of the second frame 43 is provided with a second axle 44, the extension direction of which is perpendicular to that of the second frame 43, and two ends of the second axle 44 are connected to second trailer wheels 4401.

Figure 12:
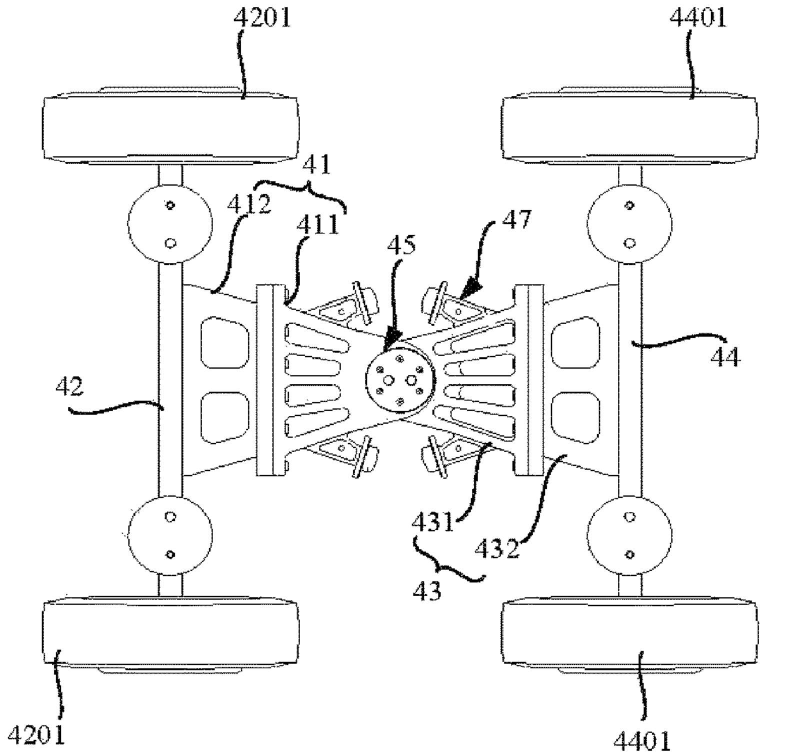
FIG. 12 is atop view of a trailer bogie provided by an embodiment of the application (a first steering driving device and a second steering driving device are omitted in the figure)
Figure 13:
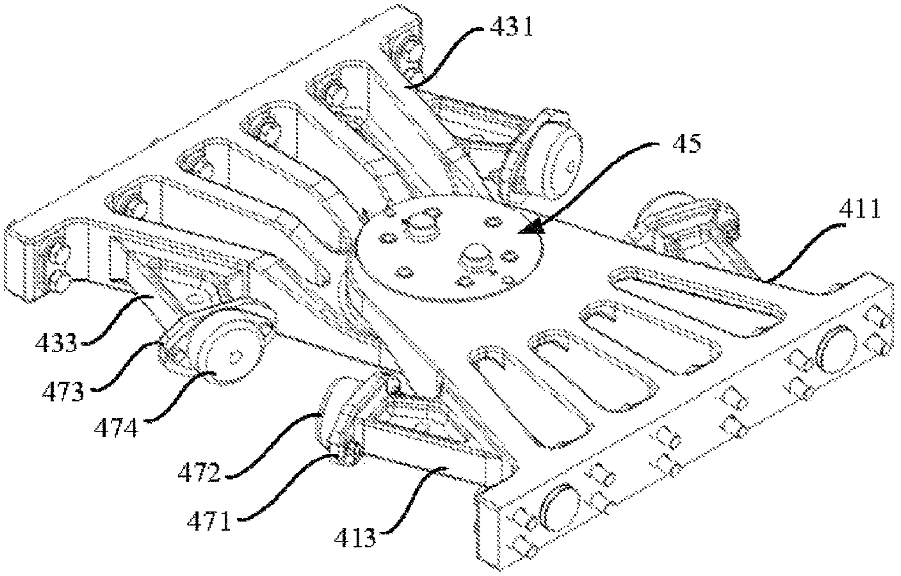
FIG. 13 is a diagram of a connection structure between a first vehicle body and a second vehicle body provided by an embodiment of the application.
Figure 14:
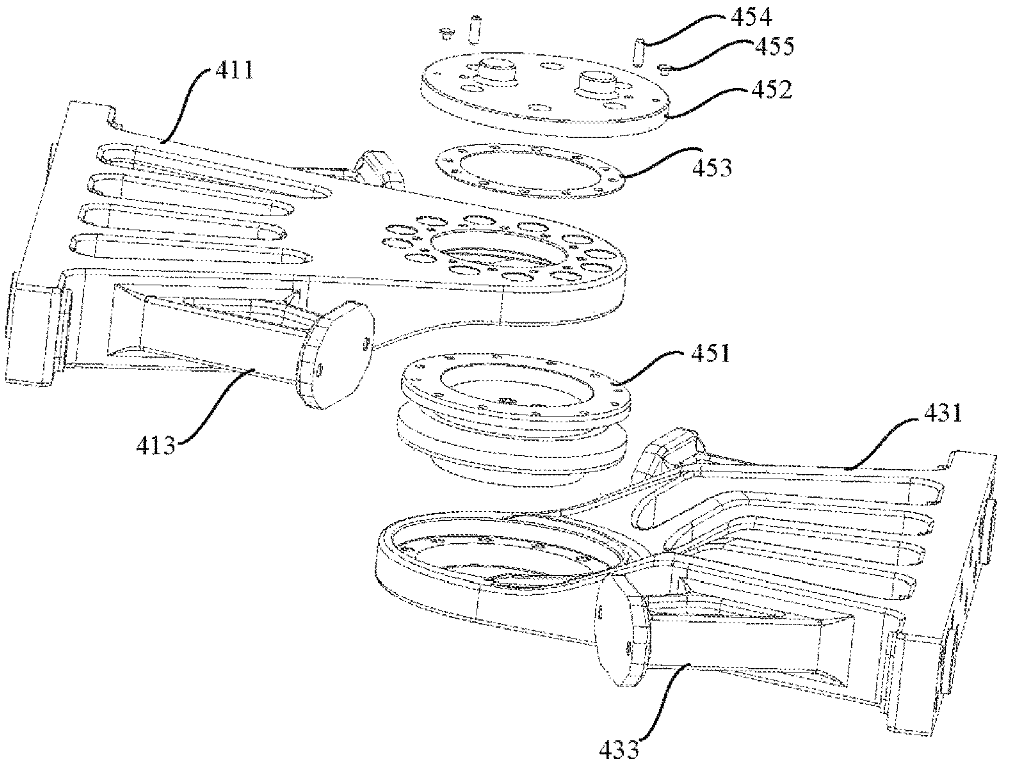
FIG. 14 is an exploded view of FIG. 13.
Figure 15:
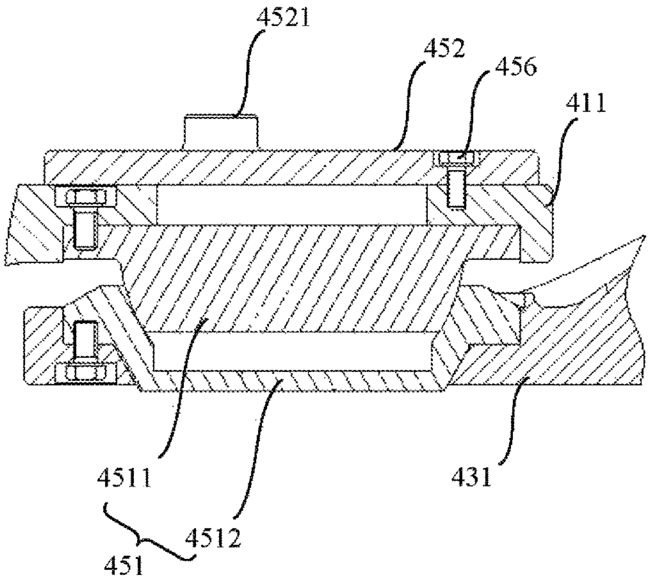
FIG. 15 is a cross-sectional view of a connection structure between a slewing bearing and a first frame and second frame provided by an implementation of the application.
Figure 16:
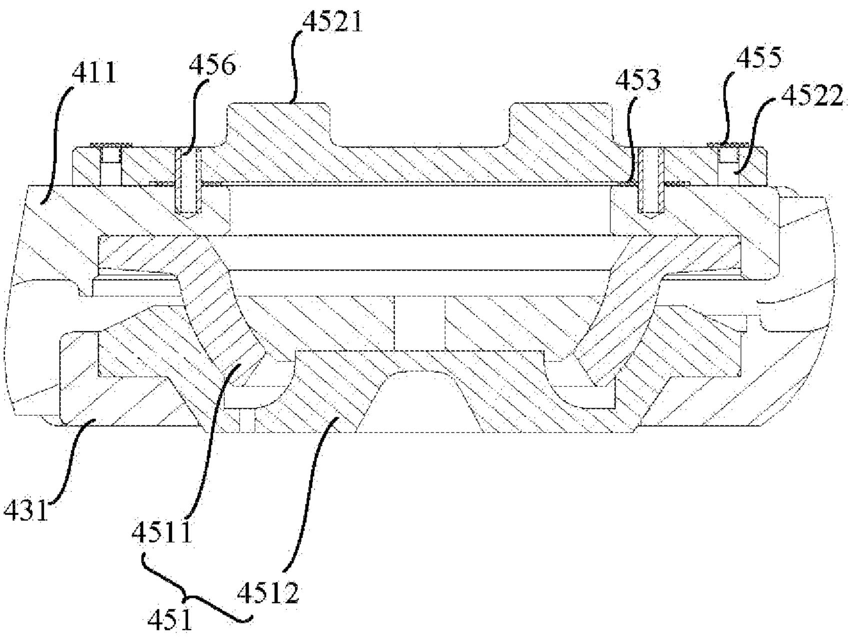
FIG. 16 is a cross-sectional view of a connection structure between a slewing bearing and a first frame and second frame provided by another implementation of the application.

FIG. 12 is a top view of a trailer bogie provided by an embodiment of the application (a first steering driving device and a second steering driving device are omitted in the figure), FIG. 13 is a diagram of a connection structure between a first vehicle body and a second vehicle body provided by an embodiment of the application, FIG. 14 is an exploded view of FIG. 13, FIG. 15 is a cross-sectional view of a connection structure between a slewing bearing and a first frame and second frame provided by an implementation of the application, and FIG. 16 is a cross-sectional view of a connection structure between a slewing bearing and a first frame and second frame provided by another implementation of the application. Please refer to FIGS. 12-16.

Further, in this embodiment, the first end of the first frame 41 and the first end of the second frame 43 are hinged to each other by a slewing support device 45.

The slewing support device 45 comprises a slewing bearing 451, which comprises a first rotator 4511 and a second rotator 4512 which are rotationally matched with each other, and their rotational axes are perpendicular to the ground. The first rotator 4511 can be connected to the first frame 41, and the second rotator 4512 can be connected to the second frame 43, that is, the first frame 41 and the second frame 43 are rotatably connected by the above-mentioned stewing bearing 451.

Specifically, the first frame 41 is fixedly connected to the first rotator 4511 through a fastener the first end of the first frame 41 is provided with a first stepped hole, which comprises a first aperture section and a second aperture section, and the aperture of the first aperture section is greater than that of the second aperture section, so as to form a first stepped surface at a transitional joint between the first aperture section and the second aperture section. The first aperture section can be arranged close to the first rotator 4511, so that the first rotator 4511 is mounted below the first stepped surface.

Similarly, the second frame 43 is fixedly connected to the second rotator 4512 through a fastener, the first end of the second frame 43 is provided with a second stepped hole, which comprises a third aperture section and a fourth aperture section, and the aperture of the third aperture section is greater than that of the fourth aperture section, so as to form a second stepped surface at a transitional joint between the third aperture section and the fourth aperture section. The third aperture section can be arranged close to the second rotator 4512, so that the second rotator 4512 is fixed above the second stepped surface.

As shown in FIG. 15, in a possible implementation, in this embodiment, the first rotator 4511 and the second rotator 4512 are arranged with one above the other, and the rotation axes of the first rotator 4511 and the second rotator 4512 are perpendicular to the ground or the first and second, stepped surfaces. The first rotator 4511 comprise a first mounting surface and a bowl-shaped spherical structure protruding from the first mounting surface, an upper bottom surface of the bowl-shaped spherical structure is fixed on the first mounting surface, and a lower bottom surface of the bowl-shaped spherical structure faces the second rotator 4512. The second rotator 4512 comprises a second mounting surface and a second spherical hole, and the second spherical hole is matched with the bowl-shaped spherical structure and faces the first rotator 4511.

A second mounting surface of the second rotator 4512 is attached to the second stepped surface, and is connected to the second stepped surface by a bolt, and the second rotator 4512 is embedded in the second frame 43. The first mounting surface of the first rotator 4511 is attached to the first stepped surface, and is connected to the first stepped surface by a bolt. Part of the bowl-shaped spherical structure is inserted into the second spherical hole, and a side face of the bowl-shaped spherical structure is attached to a hole wall of the second spherical hole. A gap exists between the first frame 41 and the second frame 43 in the vertical direction, so that the bowl-shaped spherical structure can tilt to one side in the second spherical hole, that is, the first rotator 4511 and the second rotator 4512 not only can rotate around the rotation axis, but also, can realize eccentric rotation.

As shown in FIG. 16, in another possible implementation, the first rotator 4511 and the second rotator 4512 are arranged with one above the other, the first rotator 4511 is provided with a first mounting surface, and the first mounting surface is attached and fixed to a first stepped surface the second rotator 4512 is provided with a second mounting surface, and the second mounting surface is attached and fixed to a second stepped surface; the second rotator 4512 is provided with a bowl-shaped spherical structure, the first rotator 4511 is provided with a first spherical hole matched with the bowl-shaped spherical structure, and a side face of the bowl-shaped spherical structure is attached to a side wall of the first spherical hole; and a gap exists between the first frame 41 and the second frame 43 in the vertical direction, so that the bowl-shaped spherical structure can tilt to one side in the first spherical hole, that is, the first rotator 4511 and the second rotator 4512 not only can rotate around the rotation axis, but also can realize lateral deflection.

In this embodiment, the first rotator 4511 and the second rotator 4512 are arranged with one above the other, and the rotation axes of the first rotator 4511 and the second rotator 4512 are perpendicular to the ground or the first stepped surface and the second stepped surface. The second mounting surface of the second rotator 4512 is attached to the second stepped surface, and is connected to the second stepped surface by a bolt, and the second rotator 4512 is embedded in the second frame 43. The first mounting surface of the first rotator 4511 is attached to the first stepped surface, and is connected to the first stepped surface by a bolt, and a certain gap exists between the first frame 41 and the second frame 43, so that the first rotator 4511 and the second rotator 4512 have a certain lateral deflection ability in the process of rotating around the rotation axis, which can improve the curve passing performance and adaptability of the vehicle.

Figure 17:
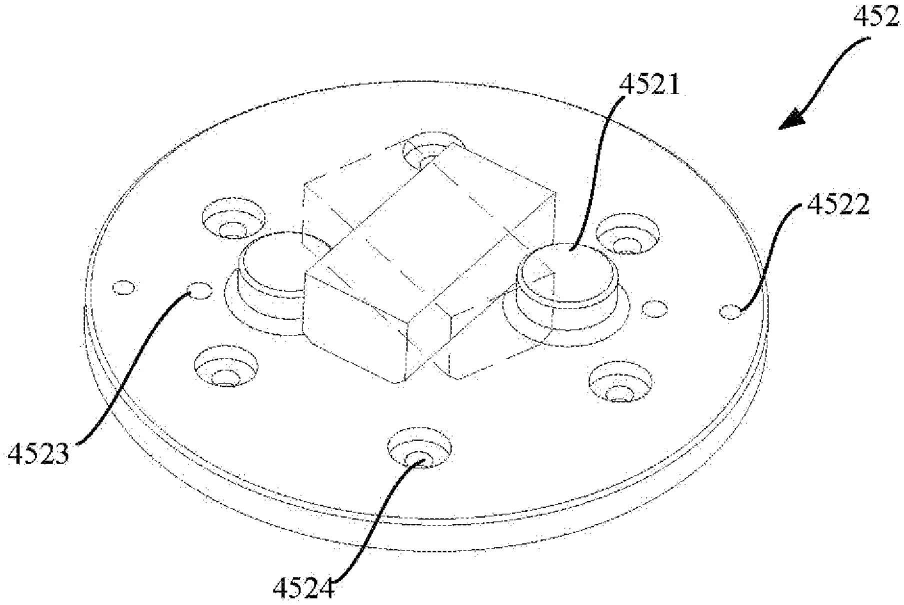
FIG. 17 is a structural diagram of a slewing support cover plate in a first state provided by an embodiment of the application.
Figure 18:
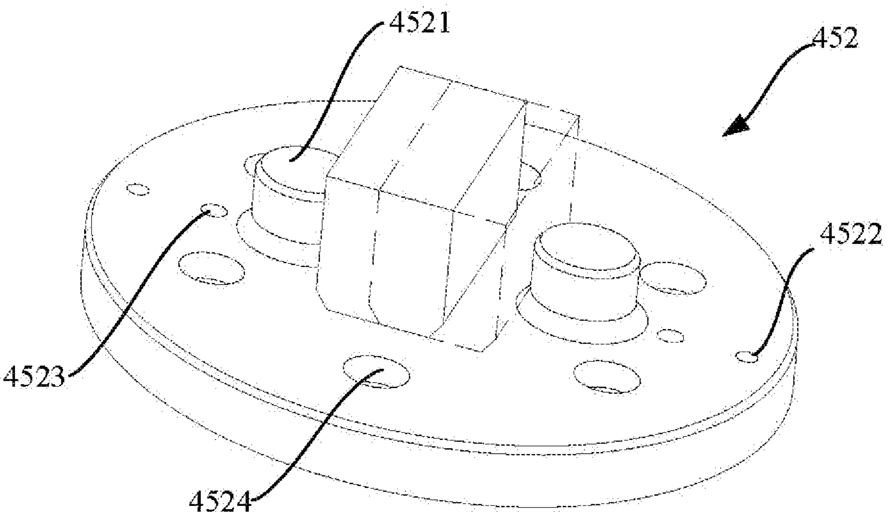
FIG. 18 is a structural diagram of a slewing support cover plate in a second state provided by an embodiment of the application.

FIG. 17 is a structural diagram of a slewing support cover plate in a first state provided by an embodiment of the application, and FIG. 18 is a structural diagram of a slewing support cover plate in a second state provided by an embodiment of the application. Please refer to FIGS. 15-18.

In this embodiment, a stewing support cover plate 452 is further arranged above the first frame 41, and the slewing support cover plate 452 is used for sealing the first stepped hole of the first frame 41. The slewing support cover plate 452 can be a circular plate, which is arranged at the first end of the first frame 41 and attached and fixed to a surface of the first frame 41 to seal the first stepped hole. For example, the slewing support cover plate 452 is arranged at the first stepped hole in a covering mode and fixed on the first frame 41. With this arrangement, dust, foreign matter, rainwater and the like can be prevented from entering the slewing support, so that the reliability of a slewing support device 45 can be improved.

Two through passage limit bosses 4521 are arranged on a side, away from the first frame 41, of the slewing support cover plate 452, and the two through passage limit bosses 4521 are arranged on the slewing support cover plate 452 at intervals and protrude from a surface of the slewing support cover plate 452, so as to form a through passage limit space. On a bottom surface, facing the slewing support cover plate 452, of a through passage, a through passage limit block is provided, and the through passage limit block can be embedded in the limit space.

The through passage limit block can be limited between the two through passage limit bosses 4521, and the through passage limit bosses 4521 can limit the deformation and rotation angle of the through passage.

For example, the two through passage limit bosses 4521 can be arranged in a central area of the slewing support cover plate 452 and symmetrically distributed on the slewing support cover plate 452. The slewing support cover plate 452 can be a circular stewing support cover plate 452, the two through passage limit bosses 4521 are symmetrically arranged along a center of the slewing support cover plate 452, and the two through, passage limit bosses 4521 have a certain distance, which serves as a space allowing the through passage limit block to be inserted therein. Along the length direction of the bogie, the two through passage limit bosses 4521 are located on the left and right sides of the through passage limit block respectively, so as to limit the deformation and rotation angle of the through passage, preventing excessive deformation and rotation of the through passage.

Please refer to FIG. 16. On the basis of the above implementation, an annular waterproof pad 453 is, further arranged between the slewing support cover plate 452 and the first frame 41 to prevent water from entering the slewing bearing 451 so as to avoid corrosion of the slewing bearing 45, thus improving the rotation reliability of the first frame 41 and the second frame 43.

Specifically, a side, facing the first frame 41, of the slewing support cover plate 452 is provided with a sinking platform to form an installation space for the waterproof pad 453, and the waterproof pad 453 is arranged around the second stepped hole. One side of the waterproof pad 453 abuts against the slewing support cover plate 452 and the other side abuts against the first frame 41, and the free thickness of the waterproof pad 453 is greater than the depth of the sinking platform. After installation, the waterproof pad 453 is in a compressed state. By compressing the waterproof pad 453, the waterproof effect between the slewing support cover plate 452 and the first frame 41 can be improved.

Further, the slewing support cover plate 452 is fixed on the first frame 41 by a plurality of cover plate fasteners 456. For example, the plurality of cover plate fasteners 456 are arranged at equal intervals in the circumferential direction of the slewing support cover plate 452, and the first frame 41 is provided with cover plate fastener mounting holes 4524 matched with the cover plate fasteners 456. The cover plate fastener 456 may be a fastening bolt, and the cover plate fastener mounting hole 4524 provided in the first frame 41 may be a threaded hole. One end of the cover plate fastener 456 passes through a gasket and the slewing support cover plate 452 and is fixed on the first frame 41, thereby fixing the slewing support cover plate 452 on the first frame 41.

On the basis of the above implementation, the cover plate fasteners 456 can be arranged opposite to the waterproof pad 453 to improve the waterproof effect between the first frame 41 and the slewing support cover plate 452. For example, the waterproof pad 453 is arranged opposite to the cover plate fasteners 456, and the waterproof pad 453 is provided with through holes through which the cover plate fasteners 456 pass, that is, one end of the cover plate fastener 456 passes through the slewing support cover plate 452 and the waterproof pad 453 and is fixed on the first frame 41, so that the waterproof effect between the slewing support cover plate 452 and the first frame 41 can be improved.

With reference to FIG. 14, in order to prevent the cover plate fasteners 456 from breaking when the slewing support cover plate 452 is impacted by the through passage, an elastic pin 454 is further provided between the slewing support cover plate 452 and the first frame 41 in this embodiment, and the elastic pin 454 is used for resisting the impact on the slewing support cover plate 452 by the through passage. Specifically, two elastic pins 454 are arranged between the slewing support cover plate 452 and the first frame 41. The two elastic pins 454 are respectively located on the outer sides, away from the through passage, of the two through passage limit bosses 4521, and the elastic pins 454 are arranged opposite to the through passage limit bosses 4521. For example, the stewing support cover plate 452 is provided with two elastic pin mounting holes 4523, the two through passage limit bosses 4521 are located between the two elastic pin mounting holes 4523, and the elastic pins 454 are inserted into the elastic pin mounting holes 4523 and fixed on the first frame 41. The impact received by the through passage limit bosses 4521 can be transmitted to the elastic pins 454 along a straight line, so as to improve the impact counteracting effect.

Further, the elastic pins 454 can be arranged opposite to the waterproof pad 453, the waterproof pad 453 is provided with through holes for the elastic pins 454 to pass through, and one end of the elastic pin 454 passes through the stewing support cover plate 452 and the waterproof pad 453 and is inserted into the first frame 41. With this arrangement, the waterproof effect of the waterproof pad 453 on the slaving support cover plate 452 and the first frame 41 can be improved.

Please refer to FIG. 16. On the basis of the above implementation, the stewing support cover plate 452 in this embodiment is further provided with a withdrawal threaded hole 4522 and a sealing plug 455 for sealing the withdrawal threaded hole 4522, and the withdrawal threaded hole 4522 runs through the stewing support cover plate 452. When the stewing, support cover plate 452 needs to be disassembled, the sealing plug 455 is disassembled from the withdrawal threaded hole 4522, so that one end of the withdrawal threaded hole 4522 is open, then a tool bolt is screwed into the withdrawal threaded hole 4522, an end of the tool bolt abuts against the first frame 41, and an external force is applied to the tool bolt to separate the slaving support cover plate 452 from the first frame 41. Accordingly, when it is not necessary to disassemble the stewing support cover plate 452, the sealing plug 455 is mounted in the withdrawal threaded hole 4522 and seals the withdrawal threaded hole 4522.

Figure 19:
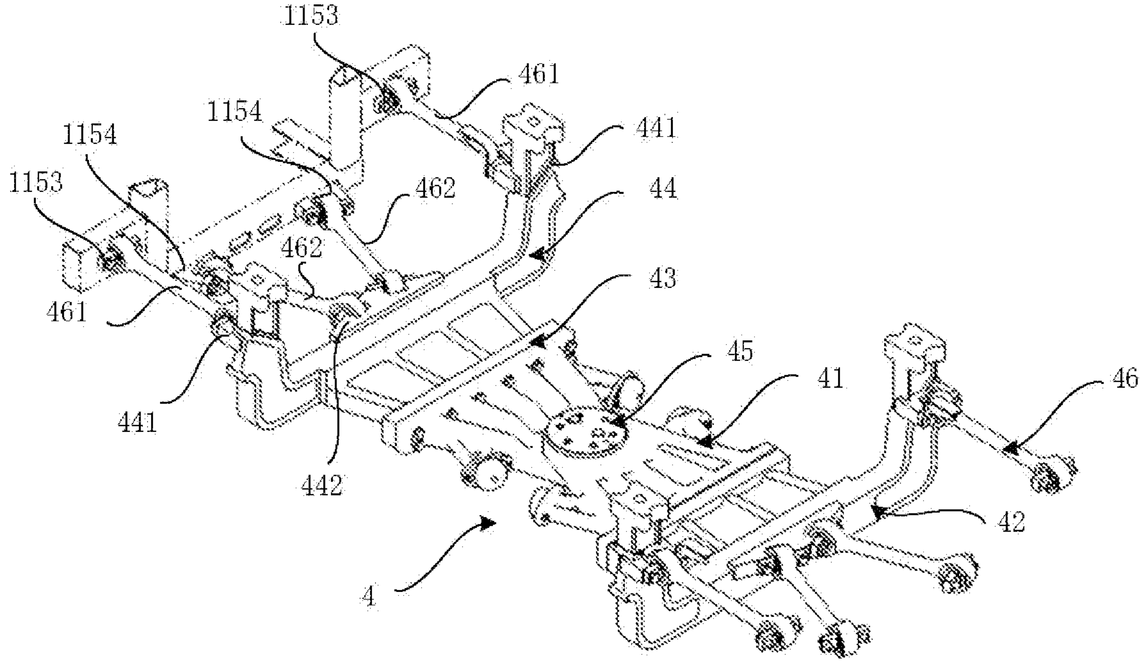
FIG. 19 is a diagram of a connection structure between a trailer bogie and a vehicle body provided by an embodiment of the application.
Figure 20:
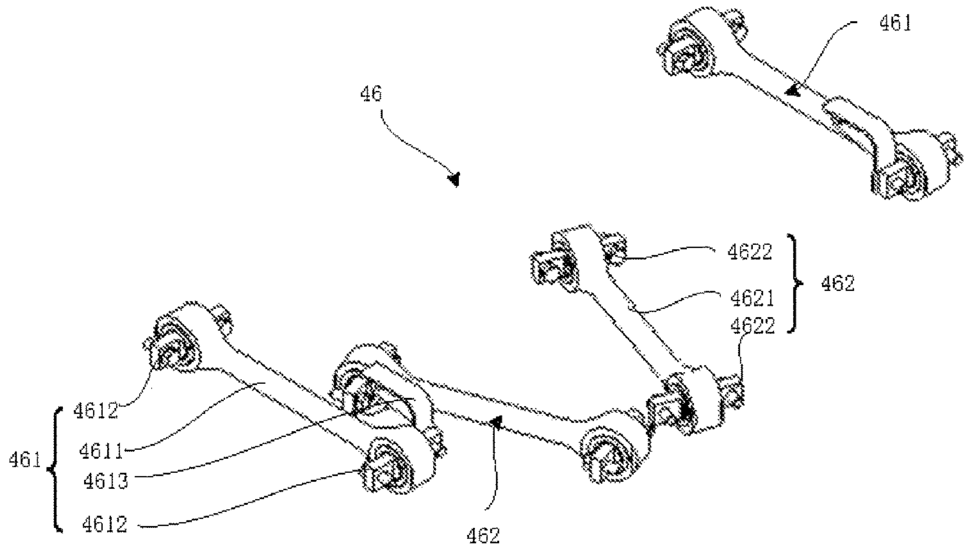
FIG. 20 is a structural diagram of a trailer traction device provided by an embodiment of the application.

FIG. 19 is a diagram of a connection structure between a trailer bogie and a vehicle body provided by an embodiment of the application, and FIG. 20 is a structural diagram of a trailer traction device provided by an embodiment of the application. Please refer to FIGS. 19-20. Further, the trailer bogie 4 of this embodiment further comprises trailer traction devices 46, which are arranged on a side, backing onto the first frame 41, of the first axle 42 and a side, backing onto the second frame 43, of the second axle 44. The trailer traction device 46 is used for connecting the trailer bogie 4 with the adjacent first or second vehicle body, so as to transmit the traction or braking force between the trailer bogie 4 and the vehicle body, and adapt to the relative movement in all directions between the adjacent first or second Vehicle bodies. In this embodiment, a connection structure between the trailer traction device 46 and an EMU body is taken as an example, and a connection structure between the other side and an intermediate vehicle body is not shown.

Specifically, please refer to FIGS. 19 and 20, the trailer traction device 46 of this embodiment comprises two first traction components 461 and two second traction components 462.

Two ends of the first traction component 461 are respectively connected to a first axle traction rod base 441 on the trailer bogie 4 and a first vehicle body traction rod base 1153 on the vehicle body. The first axle traction rod bases 441 and the first vehicle body traction rod bases 1153 are arranged in one-to-one correspondence, and the first axle traction rod bases 441 and the first vehicle body traction rod bases 1153 are located on two sides of the vehicle body in the width direction. Two ends of the first traction component 461 can be vertically connected to the first axle traction rod base 441 and the first vehicle body traction rod base 1153. After connection, the two first traction components 461 are parallel to each other and consistent with the length direction of the vehicle body.

Two ends of the second traction component 462 are respectively connected to a second axle traction rod base 442 on the trailer bogie 4 and a second vehicle body traction rod base 1154 on the vehicle body. The second axle traction rod base 442 is located between the two first axle traction rod bases 441 and between the two second vehicle body traction rod bases 1154 in the width direction of the vehicle body, and the second axle traction rod base 442 is inclined toward the adjacent first axle traction rod base 441. The second vehicle body traction rod base 1154 is located between the two first vehicle body traction rod bases 1153, and the second vehicle body traction rod base 1154 is inclined away from the adjacent first vehicle body traction rod base 1153. The two second traction components 462 are obliquely arranged, and the ends of the two second traction components 462 connected to the trailer bogie 4 are located between the ends of the two second traction components 462 connected to the vehicle body, so that the two second traction components 462 form a splay shape after being connected.

With the above arrangement, the two first traction components 461 and the two second traction components 462 jointly transmit the traction and braking force between the trailer bogie 4 and the vehicle body connected thereto, thus reducing the load on each traction component, and distributing the traction and braking force equally to the whole vehicle body framework and the trailer bogie 4, which avoids stress concentration.

Meanwhile, this embodiment can keep the height of the two first traction components 461 consistent with the height of a wheel center, so as to reduce the loss of the traction and braking force during transmission, and also reduce the rate of wheel load reduction; and the two second traction components 462 can ensure the smooth transmission of the traction and braking force when the vehicle passes through a small curve, thus improving the transmission efficiency.

Optionally, please refer to FIG. 20, the first traction component 461 of this embodiment comprises a first traction rod 4611 and two first traction rod nodes 4612. Two ends of the first traction rod 4611 are provided with first traction rod through holes respectively, the axial direction of the first traction rod through hole is perpendicular to the axial direction of the first traction rod 4611, and the first traction rod nodes 4612 are fixedly connected to the first traction rod through holes, that is, after one end of the first traction rod node 4612 passes through the first traction rod through hole, a middle part of the first traction rod node 4612 is fixed to the first traction rod through hole. The parts, located on two sides of the first traction rod through hole, of the first traction rod node 4612 are connected to the first axle traction rod base 441 or the first vehicle body traction rod base 1153 through bolts, hinges, etc.

The second traction component 462 comprises a second traction rod 4621 and two second traction rod nodes 4622. Two ends of the second traction rod 4621 are provided with second traction rod through holes respectively, and the axial direction of the second traction rod through hole is perpendicular to the axial direction of the second traction rod 4621. The second traction rod nodes 4622 are fixedly connected to the second traction rod through holes, that is, after one end of the second traction rod node 4622 passes through the second traction rod through hole, a middle part of the second traction rod node is connected to the second traction rod through hole. The parts, located on two sides of the second traction rod through hole, of the second traction rod node 4622 are connected to the second axle traction rod base 442 or the second vehicle body traction rod base 1154 through bolts, hinges, etc.

Preferably, please still refer to FIGS. 19 and 20, in this embodiment, the parts, located on two sides of the first traction rod through hole, of the first traction rod node 4612 are respectively provided with first connecting holes connected to the first axle traction rod base 441 or the first vehicle body traction rod base 1153. A first fastener passes through the first connecting hole and is fixed on the first axle traction rod base 441 or the first vehicle body traction rod base 1153. The first connecting hole may be a through hole, and the first fastener may be a bolt. Both the first axle traction rod base 441 and the first vehicle body traction rod base 1153 are provided with screw fixing holes which are matched with the first fasteners, and the first fastener can pass through the first connecting hole and be fixed in the screw fixing hole.

The parts, located on two sides of the second traction rod through hole, of the second traction rod node 4622 are respectively provided with second connecting holes for being connected to the second axle traction rod base 442 or the second vehicle body traction rod base 1154. A second fastener passes through the second connecting hole and is fixed on the second axle traction rod base 442 or the second vehicle body traction rod base 1154. The second connecting hole may be a through hole, and the second fastener may be a bolt. Both the second axle traction rod base 442 and the second vehicle body traction rod base 1154 are provided with screw fixing holes which are matched with the second fasteners, and the second fastener can pass through the first connecting hole and be fixed in the screw fixing hole.

In this implementation, bolt connection can facilitate the mounting and dismounting of the traction component, thus facilitating subsequent overhaul and maintenance.

Further, please still refer to FIG. 20, the first traction component 461 of this embodiment further comprises a height valve rod mounting base 4613, which is used for mounting a height valve rod to realize the function of adjusting an air spring within a limited space.

The height valve rod mounting base 4613 is located on a side, facing the trailer bogie 4, of the first traction rod 4611, and is fixedly connected to a side, facing the second traction component 462, of the first traction rod node 4612.

Specifically, the height valve rod mounting base 4613 of this embodiment comprises a first flat plate and a second flat plate which are perpendicular to each other, the first flat plate is provided with a first fixing hole matched with the first connecting hole, and the second flat plate is used for mounting the height valve rod. The first flat plate and the second flat plate may be formed by bending the same steel plate, and a rib plate can be welded between them to increase connection strength.

Figure 21:
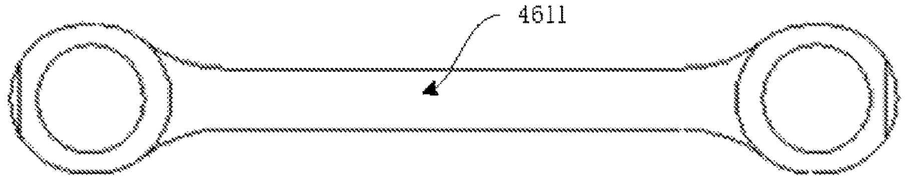
FIG. 21 is a front view of a first traction rod provided by an embodiment of the application.
Figure 22:
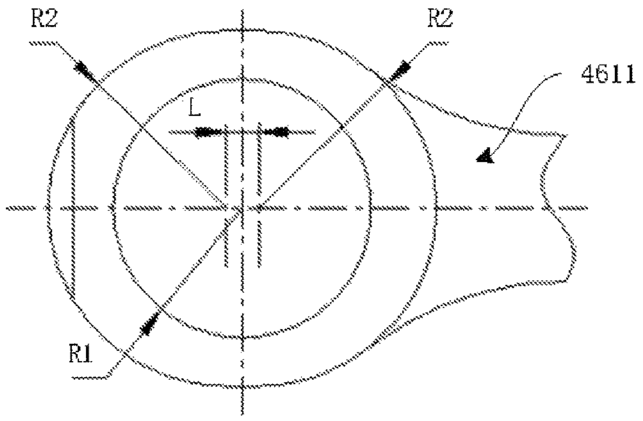
FIG. 22 is a partial view of a first traction rod provided by an embodiment of the application.

FIG. 21 is a front view of a first traction rod provided by an embodiment of the application, and FIG. 22 is a partial view of a first traction rod provided by an embodiment of the application. Please refer to FIGS. 21-22. Optionally, the first traction rod through hole and the second traction rod through hole in this embodiment are both of an obround structure, so as to increase the strength of a joint between the traction rod node and the traction rod. Taking the first traction rod 4611 as an example, the radius of the first traction rod through hole is R1, and the above-mentioned oblong structure is that the end of the first traction rod 4611 covered with the first traction rod through hole is composed of two semicircular structures with a radius R2 and a horizontal part with a length L connected to the two semicircular structures, wherein the distance between the center of the semicircular structure and the center of the first traction rod through hole is L/2.

Figure 23:
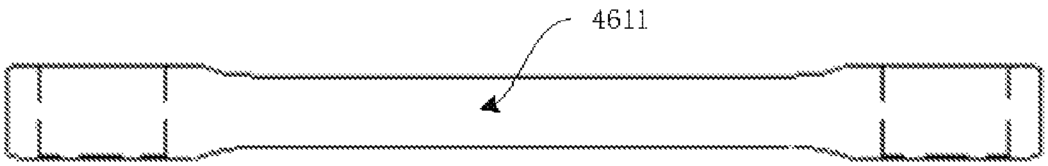
FIG. 23 is a top view of a first traction rod provided by an embodiment of the application.

FIG. 23 is a top view of a first traction rod provided by an embodiment of the application. Please refer to FIG. 23. Further, in this embodiment, two ends of the first traction rod 4611 and the second traction rod 4621 are provided with chamfers to avoid interference with the vehicle body or trailer bogie 4 during operation.

Preferably, in this embodiment, the first traction rod 4611 is a metal rod, the first traction rod node 4612 comprises a metal part and a rubber part, and the metal part and the rubber part are integrally vulcanized and molded. The second traction rod 4621 is a metal rod, the second traction rod node 4622 comprises a metal part and a rubber part, and the metal part and the rubber part are integrally vulcanized and molded.

The traction rods of this embodiment are forged and machined from alloy steel materials, and have high strength and good toughness. The traction bar nodes are made of metal and rubber through vulcanization, which can cushion the impact during traction and braking, adapt to the relative movement between the vehicle body and trailer bogie 4, and optimize the stress state of the vehicle body and trailer bogie 4.

Figure 24:
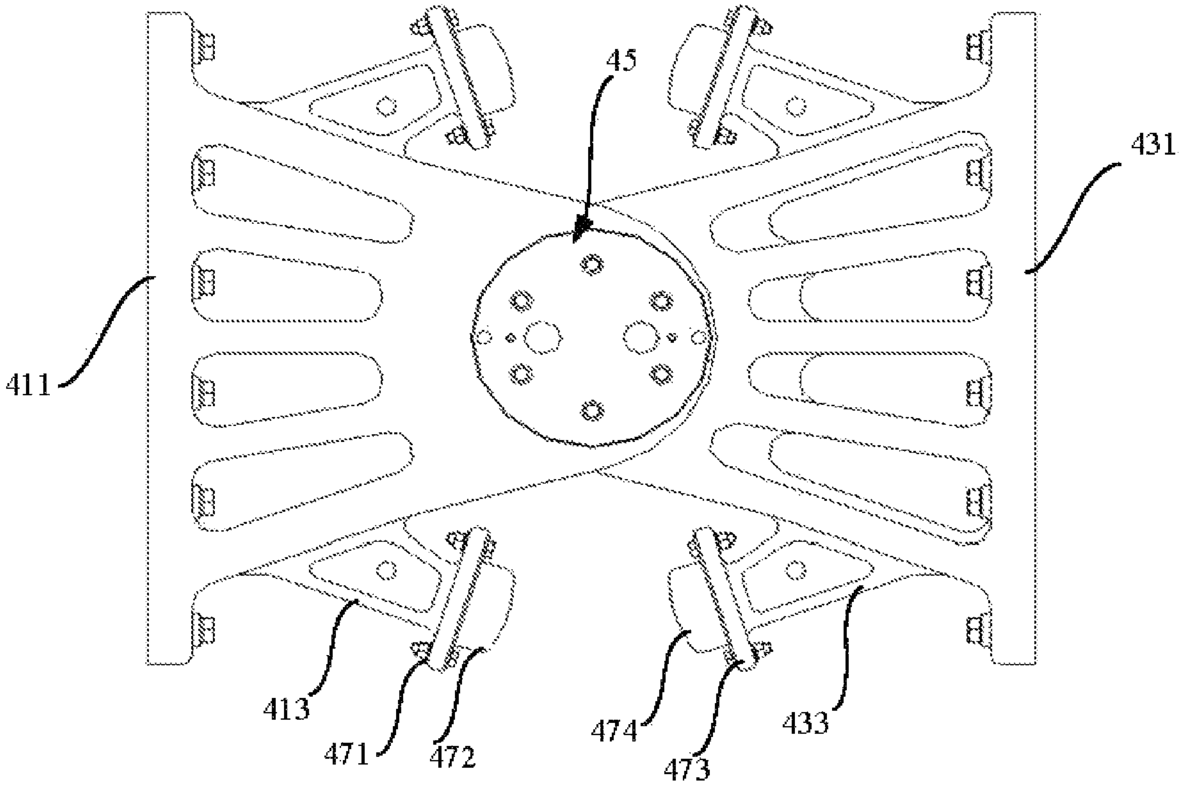
FIG. 24 is a structural diagram of a first frame and a second frame in a first state provided by an embodiment of the application.
Figure 25:
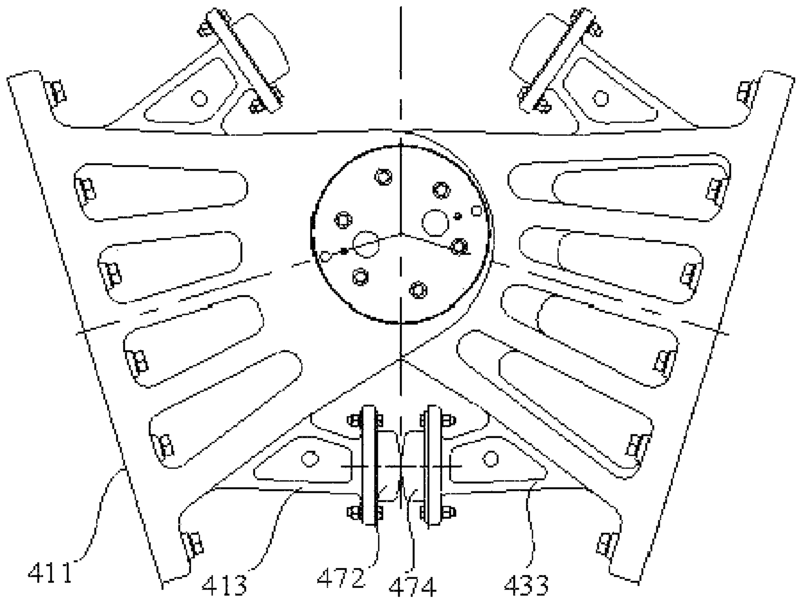
FIG. 25 is a structural diagram of a first frame and a second frame in a second state provided by an embodiment of the application.

FIG. 24 is a structural diagram of a first frame and a second frame in a first state provided by an embodiment of the application, and FIG. 25 is a structural diagram of a first frame and a second frame in a second state provided by an embodiment of the application. Please refer to FIGS. 24-25. Further, when the trailer bogie passes through a curve, in order to adapt to the radius of the curve, there should be a certain included angle between different frames in the curve section. The trailer bogie provided in this embodiment further comprises frame buffer devices 47. In the direction from the first axle 42 to the second axle 44, the first end of the first frame 41 is symmetrically provided with two frame buffer devices 47, and the first end of the second frame 43 is symmetrically provided with two frame buffer devices 47. To facilitate the description of this embodiment, the frame buffer devices 47 provided on the first frame 41 can be defined as first frame buffer devices, and the frame buffer devices 47 provided on the second frame 43 can be defined as second frame buffer devices.

The first frame buffer device is matched with the second frame buffer device, and when the first frame 41 and the second frame 43 rotate by a certain angle, the first frame buffer device and the second frame buffer device can abut against each other. Further, the first frame buffer device and the second frame buffer device located on the same side can be located on the same rotation path. When the first frame 41 and the second frame 43 rotate relatively, a gap between the first frame buffer device and the second frame buffer device gradually decreases until the first frame buffer device and the second frame buffer device contact each other, which provides a buffer force for the first frame 41 and the second frame 43, thus avoiding rigid contact between the first frame 41 and the second frame 43. Upon continuous pressing, the first frame buffer device and the second frame buffer device will no longer be elastically deformed, so that the first frame 41 and the second frame 43 can be limited to achieve the purpose of rigidity limitation, thereby limiting the rotation angle between the first frame 41 and the second frame 43.

Please still refer to FIG. 24, in a possible implementation, the first frame buffer device comprises a first buffer block 472 and a first buffer block mounting base 471, the first buffer block mounting base 471 is used for mounting the first buffer block 472, and the first buffer block mounting, base 471 is mounted on the first frame 41 through a first buffer base mounting arm 413. It can be understood that the first frame buffer device is a part compounded by the buffer block made of rubber and the metal mounting base with a certain process. The metal mounting base is fixedly connected to the first buffer base mounting arm 413, and the rubber buffer block is suspended and used as a buffer.

The first buffer base mounting arm 413 may be an arc-shaped retaining arm, and its bending extension direction is consistent with the rotation direction of the first frame 41. One end of the first buffer base mounting arm 413 is fixedly connected to the first frame 41, and the first buffer block mounting base 471 is fixed to the other end of the first buffer base mounting arm 413. Similarly, the second frame buffer device comprises a second buffer block 474 and a second buffer block mounting base 473, and the second frame buffer device is mounted on the second frame 43 through a second buffer base mounting arm 433. The structure of the second buffer base mounting arm 433 can be determined by referring to the structure of the first buffer base mounting arm 413, and will not be repeated here.

Please still refer to FIG. 25. Preferably, when the first frame buffer device and the second frame buffer device are in contact, the first buffer block 472 and the second buffer block 474 can make contact on front sides, and the first buffer block 472 faces second rubber, so as to provide the maximum buffer for the first frame buffer device and the second frame buffer device, and reduce the vibration and noise caused by impact during the rotation of the first frame 41 and the second frame 43.

On the basis of the above implementation, in order to facilitate the mounting of a stand between the first axle 42 and the second axle 44, the first frame 41 and the second frame 43 provided in this embodiment are each of a split structure. The first frame 41 comprises a first frame connecting part 412 connected to the first axle 42 and a first frame hinging part 411 connected to the first frame connecting part 412. The first frame connecting part 412 is fixedly connected to the first axle 42, or the first frame connecting part 412 and the first axle 42 can be made into an integral structure.

One end of the first frame hinging part 411 is fixedly connected to the first frame connecting part 412 by a bolt, and the other end of the first frame hinging part 411 is connected to the first rotator 4511 of the slewing bearing 451. Two sides of the first frame hinging part 411 are respectively provided with the first buffer base mounting arms 413, and the first buffer base mounting arms 413 and the first frame hinging part 411 can form an integral structure, so as to enhance the connection strength between the first buffer base mounting arms 413 and the first frame hinging part 411.

Similarly, the second frame 43 comprises a second frame connecting part 432 connected to the second axle 44, and a second frame hinging part 431 connected to the second frame connecting part 432, the second frame connecting part 432 is fixedly connected to the second axle 44, or the second frame connecting part 432 and the second axle 44 can be made into an integral structure. One end of the second frame connecting part 432 is fixedly connected to the second frame hinging part 431 by a bolt, and the other end of the second frame hinging part 431 is connected to the second rotator 4512 of the slewing bearing 451. Two sides of the second frame hinging part 431 are respectively provided with the second buffer base mounting arms 433, and the second buffer base mounting arms 433 and the second frame hinging part 431 can form an integral structure, so as to enhance the connection strength between the second buffer block mounting base 473 and the second frame hinging part 431.

Please still refer to FIGS. 24 and 25. In order to increase the rotation angle between the first frame 41 and the second frame 43, the first frame 41 and the second frame 43 form a triangular or trapezoidal structure, the second end of the first frame 41 is connected to the first axle 42, the first end is connected to the slewing bearing 451, the second end of the second frame 43 is connected to the second axle 44, and the first end of the second frame 43 is connected to the slewing bearing 451. In this way, one ends, close to the slewing bearing 451, of the first frame 41 and the second frame 43 form a large rotating space, which meets the rotating angle requirements of the first frame 41 and the second frame 43.

Please refer to FIGS. 12, 24 and 25. On the basis of the above implementation, the first frame 41 and the second frame 43 are also provided with hollowed-out structures to reduce the weight of the first frame 41 and the second frame 43. Specifically, the first frame connecting part 412 and the first frame hinging part 411 of the first frame 41 are respectively provided with hollowed-out structures. For example, the first frame connecting part 412 may be provided with a first hollowed-out structure, which comprises two trapezoidal holes or square holes symmetrically arranged on the first frame connecting part 412, wherein the number of the trapezoidal holes or square holes in the hollowed-out structure is related to the arrangement of connecting bolts, and uniformly arranged trapezoidal or square holes are beneficial to uniform force transmission. The size of the hollowed-out space is determined by fully considering the bolt installation and fastening operation space. In this embodiment of the application, the hollowed-out structures is made to be trapezoidal or square based on the size change of two ends of connection, which facilitates gradual transition and avoids stress concentration.

The first frame hinging part 411 can be provided with a second hollowed-out structure, which comprises a plurality of elongated holes, and the elongated holes can be symmetrically arranged in the first frame hinging part 411. The extension direction of the elongated holes is parallel to the extension direction of the first frame hinging part 411. In this way, the elongated holes are consistent with the bolt arrangement direction and the direction of large longitudinal forces such as traction and braking force, which is beneficial to uniform force application to bolts.

Further, the second frame connecting part 432 and the second frame hinging part 431 of the second frame 43 are provided with hollowed-out structures. For example, the second frame connecting part 432 can be provided with a third hollowed-out structure, and the third hollowed-out structure can be set by referring to the first hollowed-out structure. The second frame hinging part 431 can be provided with a fourth hollowed-out structure, and the fourth hollowed-out structure can be set by referring to the second hollowed-out structure, which will not be repeated here.

Figure 26:
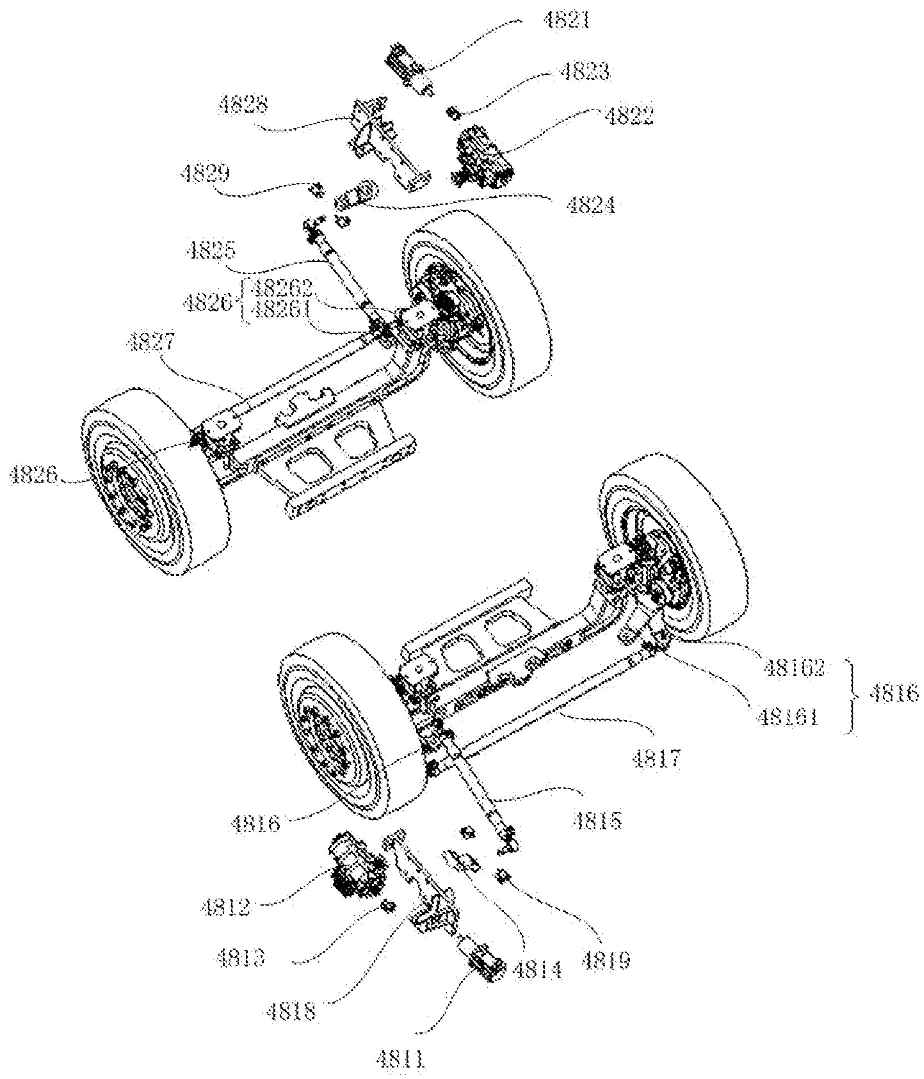
FIG. 26 is a structural diagram, of a steering driving device provided by an embodiment of the application.

FIG. 26 is a structural diagram of a steering driving device provided by an embodiment of the application. Please refer to FIGS. 11 and 26. Further, in order to realize the steering control of the trailer bogie 4, the trailer bogie of this embodiment further comprises a steering driving device. The steering driving device comprises a first steering driving device 481 connected to the first frame 41 and a second steering driving device 482 connected to the second frame 43. The first steering driving device 481 is connected to the first trailer wheel 4201 to drive the first trailer wheel 4201 to steer. The second steering driving device 482 is connected to the second trailer wheel 4401 to drive the second trailer wheel 4401 to steer.

The first frame 41 and the second frame 43 of the trailer bogie 4 of this embodiment are hinged together, the rotation of the first trailer wheel 4201 is controlled by the first steering driving device 481, and the rotation of the second trailer wheel 4401 is controlled by the second steering driving device 482, so that the steering of the first vehicle body connected to the first frame 41 and the second vehicle body connected to the second frame 43 can be separately controlled, which is conducive to reducing the turning, radius of the vehicle, facilitates driving, and improves driving flexibility on urban roads.

Specifically, the first steering driving device 481 of this, embodiment comprises a first driving part and a first transmission part, and the first driving part is used for providing steering power; and the first transmission part is connected to the first driving part and the first trailer wheel 4201, and is used for transmitting the steering power provided by the first driving part to the first trailer wheel 4201.

The second steering driving device 482 comprises a second driving part and a second transmission part, and the second driving part is used for providing steering power; and the second transmission part is connected to the second driving part and the second trailer wheel 4401, and is used for transmitting the steering power provided by the second driving part to the second trailer wheel 4401.

Please refer to FIG. 26. Further, the first driving part comprises a first servo motor 4811 and a first power steering gear 4812. The first servo motor 4811 communicates with the controller, and the first servo motor 4811 is used for outputting the steering force. The first power steering gear 4812 is used for changing the direction of the steering force output by the first servo motor 4811 to provide steering power for the first transmission part. The first power steering gear 4812 is connected to an output end of the first servo motor 4811 through a first coupling 4813, and an output end of the first power steering gear 4812 is connected to the first transmission part.

The second driving part comprises a second servo motor 4821 and a second power steering gear 4822, the second servo motor 4821 communicates with the controller, and the second servo motor 4821 is used for outputting the steering force. The second power steering gear 4822 is used for changing the direction of the steering force output by the second servo motor 4821 to provide steering power for the second transmission part. The second power steering gear 4822 is connected to an output end of the second servo motor 4821 through a second coupling 4823, and an output end of the second power steering gear 4822 is connected to the second transmission part.

In a possible implementation, the first transmission part of this embodiment comprises a first power steering swing arm 4814, a first longitudinal drawbar 4815, a first trailer steering swing arm 4816 and a first lateral drawbar 4817. A first end of the first power steering, swing arm 4814 is connected to the output end of the first power steering gear 4812. A first end of the first longitudinal drawbar 4815 is connected to a second end of the first power steering swing arm 4814. The first trailer steering swing arm 4816 is fixedly connected to the first trailer wheel 4201, and comprises a first body, and a first trailer sub-swing arm 48161 and a second trailer sub-swing arm 48162 which are connected to the first body. The first body is fixedly connected to the first trailer wheel 4201, both the first trailer sub-swing arm 48161 and the second trailer sub-swing arm 48162 are connected to the first body, and an included angle is formed between the first trailer sub-swing arm 48161 and the second trailer sub-swing arm 48162. A second end of the first longitudinal drawbar 4815 is connected to the first trailer sub-swing arm 48161. Two ends of the first lateral drawbar 4817 are respectively connected to the second trailer sub-swing arms 48162 on the two first trailer steering swing arms 4816.

The second transmission part of this embodiment comprises a second power steering swing arm 4824, a second longitudinal drawbar 4825, a second trailer steering swing arm 4826 and a second lateral drawbar 4827, and a first end of the second power steering swing arm 4824 is connected to the output end of the second power steering gear 4822. A first end of the second longitudinal drawbar 4825 is connected to a second end of the second power steering swing arm 4824. The second trailer steering swing arm 4826 is fixedly connected to the second trailer wheel 4401, and comprises a second body, and a third trailer sub-swing, arm 48261 and a fourth trailer sub-swing arm 48262 which are connected to the second body. The second body is fixedly connected to the second trailer wheel 4401, the third trailer sub-swing arm 48261 and the fourth trailer sub-swing arm 48262 are both connected to the second body, and an included angle is formed between the third trailer sub-swing arm 48261 and the fourth trailer sub-swing arm 48262. A second end of the second longitudinal drawbar 4825 is connected to the third trailer sub-swing arm 48261. Two ends of the second lateral drawbar 4827 are respectively connected to the fourth trailer sub-swing arms 48262 on the two second trailer steering swing arms 4826.

In this embodiment, by adjusting the lengths of the first longitudinal drawbar 4815 and the first lateral drawbar 4817 and the included angle between the first trailer sub-swing arm 48161 and the second trailer sub-swing arm 48162, the requirement for different extreme deflection angles of the first trailer wheel 4201 when passing through a curve can be met. Similarly, by adjusting the lengths of the second longitudinal drawbar 4825 and the second lateral drawbar 4827 and the included angle between the third trailer sub-swing arm 48261 and the fourth trailer sub-swing arm 48262, the requirement for different deflection angles of the second trailer wheel 4401 when passing through a curve can be met.

When the steering driving device of this embodiment is in use, the first servo motor 4811 receives a steering input signal transmitted by the controller and then outputs steering torque. The steering torque output by the first servo motor 4811 is transmitted to a first power transmitter through the first coupling 4813, and the first power transmitter outputs rotational torque to drive the first power steering swing arm 4814 to swing. The first power steering swing arm 4814 transmits the rotational torque to the first trailer steering swing arm. 4816 through the first longitudinal drawbar 4815. Because the first trailer steering swing arm 4816 is fixedly connected to the first trailer wheel 4201, and the two first trailer steering swing arms 4816 are connected through the first lateral drawbar 4817, the two first trailer wheels 4201 can be driven to synchronously move and deflect.

Similarly, the second servo motor 4821 receives a steering input signal transmitted by the controller and then outputs steering, torque. The steering torque output by the second servo motor 4821 is transmitted to a second power transmitter through the second coupling 4823, and the second power transmitter outputs rotational torque to drive the second power steering swing arm 4824 to swing. The second power steering swing arm 4824 transmits the rotational torque to the second trailer steering swing arm 4826 through the second longitudinal drawbar 4825. Because the second trailer steering swing arm 4826 is fixedly connected to the second trailer wheel 4401, and the two second trailer steering swing arms 4826 are connected by the second lateral drawbar 4827, the two second trailer wheels 4401 can be driven to synchronously move and deflect.

Please refer to FIG. 26. In addition, this embodiment also comprises a first mounting base 4818, which is connected to the first vehicle body. The first servo motor 4811 and the first power steering gear 4812 are both arranged on the first mounting base 4818. The first mounting base 4818 is provided with a first limit switch 4819, and the first limit switch 4819 is arranged on a side, facing the first longitudinal drawbar 4815, of the first mounting base 4818. When the first longitudinal drawbar 4815 contacts the first limit switch 4819, the first limit switch 4819 generates a signal and feeds it back to the controller, and the controller will issue an instruction to stop the first power transmitter from moving in this direction.

This embodiment also comprises a second mounting base 4828, which is connected the second vehicle body. The second servo motor 4821 and the second power steering gear 4822 are both arranged on the second mounting base 4828. The second mounting base 4828 is provided with a second limit switch 4829, and the second limit switch 4829 is arranged on a side, facing the second longitudinal drawbar 4825, of the second mounting base 4828. When the second longitudinal drawbar 4825 contacts the second limit switch 4829, the second limit switch 4829 generates a signal and feeds it back to the controller, and the controller will issue an instruction to stop the second power transmitter from moving in this direction.

Figure 27:
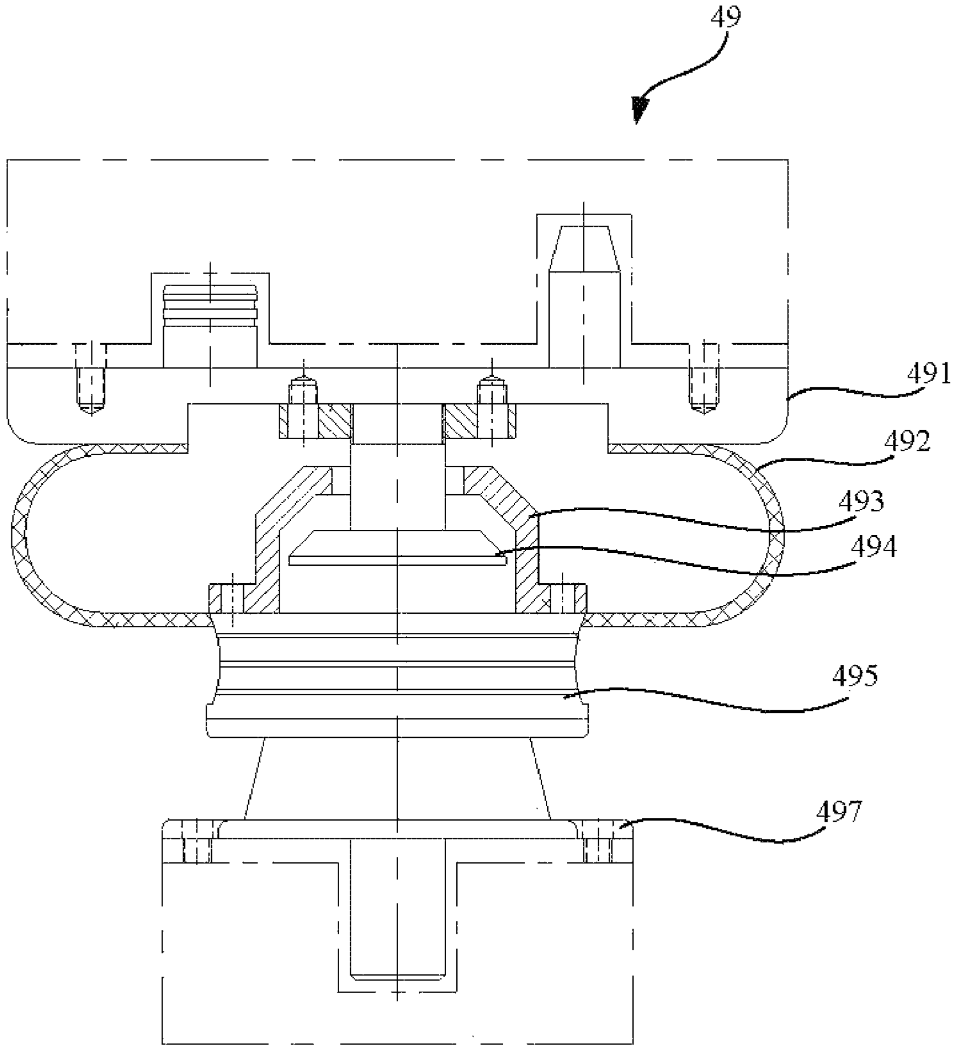
FIG. 27 is a structural diagram of air spring installation provided by an embodiment of the application.
Figure 28:
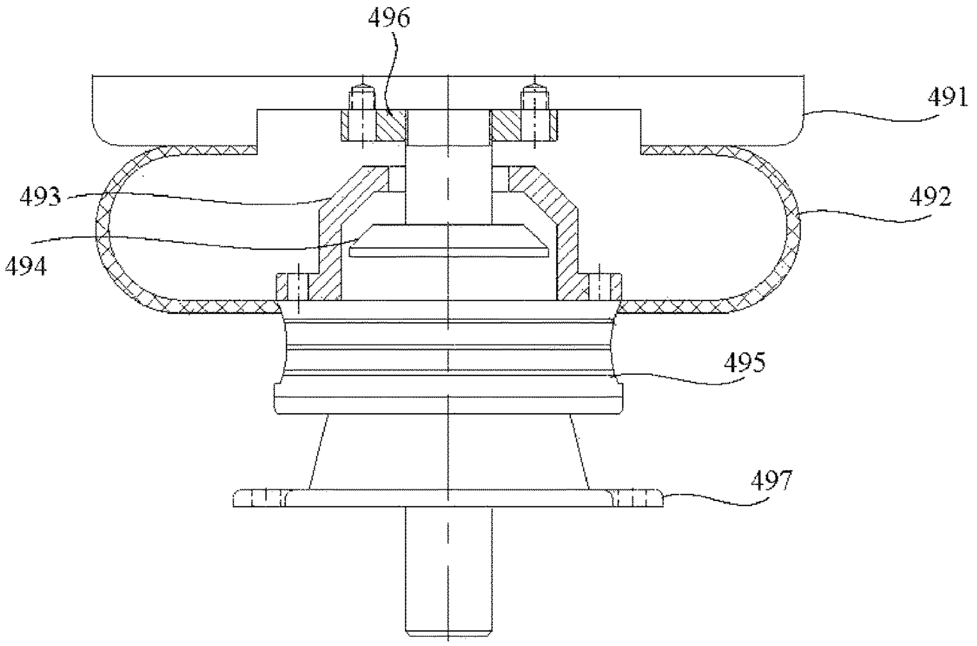
FIG. 28 is a structural diagram of an air spring provided by an embodiment of the application.
Figure 29:
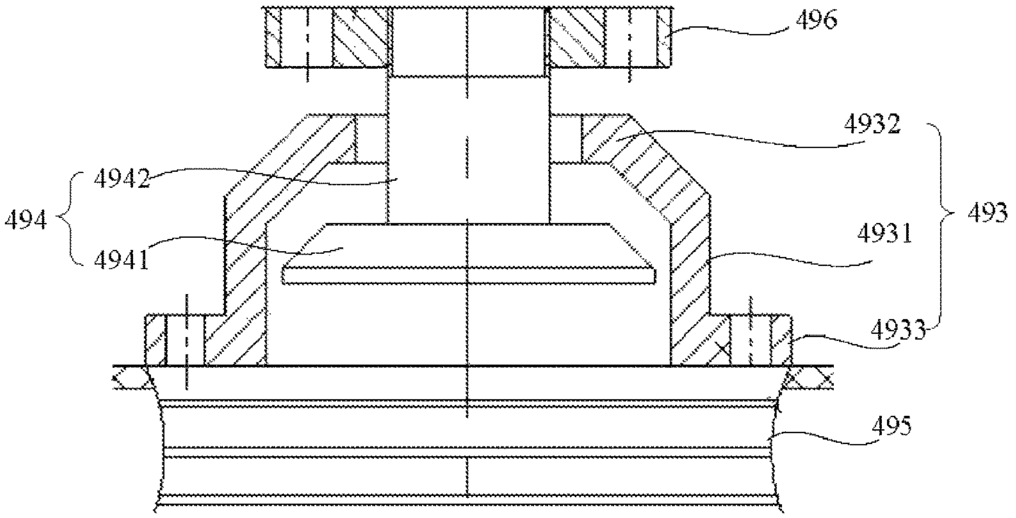
FIG. 29 is a partial cross-sectional view of a lifting component provided by an embodiment of the application.

FIG. 27 is a structural diagram of air spring installation provided by an embodiment of the application, FIG. 28 is a structural diagram of an air spring provided by an embodiment of the application, and FIG. 29 is a partial cross-sectional view of a lifting component provided by an embodiment of the application. Please refer to FIGS. 27-29. The trailer bogie 4 of this embodiment is connected to the first vehicle body and the second vehicle body through the secondary suspension devices, and the secondary suspension devices are arranged at two ends of the first axle 42 and the second axle 44.

Specifically, the secondary suspension device of this embodiment comprises an air spring 49 with a lifting function, and the air spring 49 is usually arranged below the vehicle body to provide vibration reduction for the vehicle body and slow down the vertical vibration of the vehicle body, so as to improve the comfort of passengers. The air spring 49 comprises an upper spring cover plate 491, an air bag 492, a flat rubber-metal pad 495 and a lifting component, wherein the upper spring cover plate 491, the air bag 492 and the flat rubber-metal pad 495 are arranged from top to bottom. The upper spring, cover plate 491 is located at a top of the air spring 49, which is fixedly connected to the vehicle body and can separate the air bag 492 from the vehicle body, thus reducing the risk of damage to the air bag 492 which may be caused when the air bag is directly connected to a bottom of the vehicle body.

A top of the air bag 492 is hermetically connected to the upper spring cover plate 491, a bottom of the air bag 492 surrounds a top of the flat rubber-metal pad 495, and the air bag 492 is hermetically connected to the flat rubber-metal pad 495, that is, the air bag 492, the upper spring cover plate 491 and the flat rubber-metal pad 495 form a sealed cavity, and air can be injected into or released from the air bag 492 to adjust the elasticity of the air spring 49.

Please refer to FIGS. 27 and 29, the lifting component is arranged in the sealed cavity and can be used as a lifting device between the vehicle body and the framework. The lifting component comprises a limit stop cover 493 and a limit stopper 494. A bottom of the limit stop cover 493 is fixed on the flat rubber-metal pad 495 in a covering mode, and a gap is kept between atop of the limit stop cover 493 and the upper spring cover plate 491, so that the vehicle body can vibrate in the vertical direction during running. The limit stopper 494 comprises a limit stop block 4941 and a limit stop connecting rod 4942. A top of the limit stop cover 493 is provided with a through hole which is in clearance fit with the limit stop connecting rod 4942. One end of the limit stop connecting rod 4942 passes through the through hole to be connected to the upper spring cover plate 491, and the other end of the limit stop connecting rod 4942 extends into the limit stop cover 493 and is connected to the limit stop block 4941 located in the limit stop cover 493. If a force is applied to the limit stop connecting rod 4942 to lift it up or press it down, the limit stop block 4941 can move up and down in the limit stop cover 493.

It can be understood that the gap between the top of the limit stop cover 493 and the upper spring cover plate 491, and a gap between the top of the limit stop cover 493 and the limit stop block 4941 need to be larger than the maximum vertical displacement of the vehicle in normal operation, and a gap between the limit stop block 4941 and the flat rubber-metal pad 495 needs to be larger than the gap between the top of the limit stop cover 493 and the upper spring cover plate 491, so as to prevent the limit stop block 4941 from contacting the flat rubber-metal pad 495 when the air spring works normally.

When an upward force is applied to the limit stop connecting rod 4942, the limit stop block 4941 moves upward in the limit stop cover 493, and the limit stop block 4941 can abut against the top of the limit stop cover 493 to transmit the force to the limit stop cover 493 and then to the flat rubber-metal pad 495 through the limit stop cover 493, so that the framework under the vehicle body can be lifted together with the vehicle body.

According to the air spring 49 provided in this embodiment, the lifting component is arranged in the sealed cavity formed by the air bag 492, the upper spring cover plate 491 and the flat rubber-metal pad 495, which not only makes the air spring 49 have a vibration reduction function, but also connects the vehicle body with the flat rubber-metal pad 495 in the air spring 49 by the lifting component, and then connects the framework connected to the flat rubber-metal pad 495 with the vehicle body, thus allowing the lifting device to be arranged between the vehicle body and the framework, so that the framework under the vehicle body can be, lifted together with the vehicle body.

Please refer to FIGS. 27-29. On the basis of the above implementation, the air spring 49 provided in this embodiment further comprises a limit stop mounting plate 496, which may be a rectangular plate. The limit stop mounting plate 496 is fixed on a side, facing the limit stop cover 493, of the upper spring cover plate 491. The limit stop mounting plate 496 can be fixed on the upper spring cover plate 491 by a bolt, and a gap is reserved between the limit stop mounting plate 496 and the limit stop cover 493, so as to meet the need of the vehicle body for vertical vibration during running.

The limit stop mounting plate 496 can be used for fixing the limit stop connecting rod 4942. The limit stop mounting plate 496 is provided with a threaded hole, and an end, extending out of the limit stop cover 493, of the limit stop connecting rod 4942 is screwed into the threaded hole, thereby fixing the limit stop connecting rod 4942 to the limit stop mounting plate 496.

Please refer to FIG. 29. Further, the other end of the limit stop connecting rod 4942 extends into the limit stop cover 493, and an end, located in the limit stop cover 493, of the limit stop connecting rod 4942 is connected to the limit stop block 4941 located in the limit stop cover 493. The limit stop cover 493 comprises a stop cover body 4931, stop cover limit plates 4932 located at two ends of the stop cover body 4931 and a stop cover mounting edge 4933, wherein a bottom end of the stop cover body 4931 is provided with an opening, which is opposite to the flat rubber-metal pad 495, and an end face of the opening is attached to a surface of the flat rubber-metal pad 495, so that when the limit stop block 4941 vertically moves in the limit stop cover 493, the limit stop block 4941 can pass through the opening and abut against the flat rubber-metal pad 495 to limit the limit stop block 4941, thereby limiting the vertical downward displacement of the vehicle body and improving the driving safety of the vehicle.

The stop cover mounting edge 4933 is arranged in the circumferential direction of the bottom opening of the stop cover body 4931, and the stop cover mounting edge 4933 is located outside the stop cover body 4931. The stop cover mounting edge 4933 is used for fixing the stop cover body 4931 on the flat rubber-metal pad 495. For example, the stop cover mounting edge 4933 can be formed by folding the bottom end of the stop cover body 4931 outward. The stop cover mounting edge 4933 is provided with a bolt and is fixed on the flat rubber-metal pad 495 by the bolt, so that the flat rubber-metal pad 495 and the stop cover mounting edge 4933 are attached and fixed together.

A top end of the stop cover body 4931 is provided with the stop cover limit plate 4932, which can be seen as a bottom plate of the stop cover body 4931, that is, the stop cover body 4931 and the stop cover limit plate 4932 are integrated; or the top end of the stop cover body 4931 is provided with an opening, and a stop cover limit plate 4932 for blocking the opening is provided. In this embodiment, it is preferable to adopt an integral structure of the stop cover limit plate 4932 and the stop cover body 4931 to enhance the connection strength between the stop cover body 4931 and the stop cover limit plate 4932. The stop cover limit plate 4932 is provided with a through hole through which the limit stop connecting rod 4942 passes, the through hole can be located at a center of the stop cover limit plate 4932, and the through hole is in clearance fit with the limit stop connecting rod 4942, so that the limit stop connecting rod 4942 is inserted into the through hole and can slide vertically.

Please refer to FIG. 29. Further, the limit stop block 4941 is arranged in the stop cover body 4931, and the limit stop block 4941 is fixedly connected to one end of the limit stop connecting rod 4942. It can be understood that the limit stop block 4941 and the limit stop connecting rod 4942 can be of an integral structure to improve the connection strength between the limit stop connecting, rod 4942 and the limit stop block 4941, thus preventing the limit stop connecting rod 4942 from separating from the limit stop block 4941 during lifting of the framework, which may affect the reliability of lifting.

In order to improve the reliability of lifting, a first inclined plane is arranged at a joint between the stop cover limit plate 4932 and the stop cover body 4931, and the first inclined plane is located on an inner side of the limit stop cover 493, that is, the first inclined plane can be regarded as part of an inner surface of the limit stop cover 493. A side, facing the stop cover limit plate 4932, of the limit stop block 4941 is provided with a second inclined plane, and the second inclined plane is matched with the first inclined plane. When the limit stop block 4941 is lifted up and abuts against the stop cover limit plate 4932, the first inclined plane and the second inclined plane are attached. By applying a force between the first inclined plane and the second inclined plane, the first inclined plane and the second inclined plane can be better attached, so as to improve the stability of the limit stop block 4941 and the limit stop cover 493 in the lifting, process.

On the basis of the above implementation, in order to facilitate the installation of the air spring 49 to the framework, the air spring 49 provided in this embodiment further comprises a lower spring cover plate 497, which is located on a side, away from the air bag 492, of the flat rubber-metal pad 495, and can be fixed on the framework by a bolt, so as to install the air spring 49 on the framework. It can be understood that the air spring 49 comprises a upper spring cover plate 491, an air bag 492, a flat rubber-metal pad 495 and a lower spring cover plate 497 which are arranged in sequence. The upper spring cover plate 491, the air bag 492, the flat rubber-metal pad 495 and the lower spring cover plate 497 form an integral structure, which can enhance the structural strength of the air spring 49 and the tightness of the air bag 492, and also improves the installation efficiency of the air spring 49.

Further, the lower spring cover plate 497 is provided with a positioning pin, which is located on a side, away from the flat rubber-metal pad 495, of the lower spring cover plate 497, and the positioning pin and the lower spring cover plate 497 can form an integral structure to enhance the connection strength between the lower spring cover plate 497 and the positioning pin. The framework is provided with an insertion hole matched with the positioning pin. After the positioning pin is inserted into the insertion hole of the framework, the lower spring cover plate 497 and an upper surface of the framework can be attached and fastened together by a bolt. With this arrangement, the positioning accuracy between the air spring 49 and the framework can be improved, and an acting force of the air spring 49 can vertically act on the framework, so as to achieve the damping, effect of the air spring 49.

What is claimed is:

1. An EMU bogie, comprising:

a framework which comprises two side beams opposite to each other and cross beams connected to the two side beams;

a first EMU wheelset which comprises a first axletree, and a first EMU wheel and a second EMU wheel which are arranged at two ends of the first axletree, the first axletree being connected to first ends of the two side beams;

a second EMU wheelset which comprises a second axletree, and a third EMU wheel and a fourth EMU wheel which are arranged at two ends of the second axletree, the second axletree being connected to second ends of the two side beams; and an EMU steering driving device which comprises a driving part and a transmission part, the driving part being used for providing steering power, and the transmission part being connected to the driving part, the first EMU wheelset and the second EMU wheelset, and being used for transmitting the steering power provided by the driving part to the first EMU wheelset and the second EMU wheelset;

wherein the driving part comprises:

a driving motor communicating with a controller and used for outputting a steering force; and a power steering gear having an output end connected to the transmission part and used for changing a direction of the steering force output by the driving motor to provide steering power for the transmission part, wherein the transmission part comprises:

a power steering swing arm, a first end of the power steering swing arm being connected to the output end of the power steering gear;

a power steering drawbar, a first end of the power steering drawbar being connected to a second end of the power steering swing arm;

a first tire steering swing arm fixedly connected to the first EMU wheel and comprising two first sub-swing arms, a first included angle being formed between the two first sub-swing arms, and a second end of the power steering drawbar being connected to one of the first sub-swing arms;

a second tire steering swing arm fixedly connected to the second EMU wheel and comprising two second sub-swing arms, a second included angle being formed between the two second sub-swing arms, and the other first sub-swing arm of the first tire steering swing arm being connected to one of the second sub-swing arms through a first transmission rod;

a third tire steering swing arm fixedly connected to the third EMU wheel and comprising two third sub-swing arms, a third included angle being formed between the two third sub-swing arms, and the other second sub-swing arm of the second tire steering swing arm being connected to one of the third sub-swing arms through a second transmission rod; and a fourth tire steering swing arm fixedly connected to the fourth EMU wheel and comprising two fourth sub-swing arms, a fourth included angle being formed between the two fourth sub-swing arms, and the other third sub-swing arm of the third tire steering swing arm being connected to one of the fourth sub-swing arms through a third transmission rod.

2. The EMU bogie according to claim 1, wherein, the first included angle, the second included angle, the third included angle and the fourth included angle are the same.

3. The EMU bogie according to claim 1, wherein, the length of the power steering drawbar, the length of the first transmission rod, the length of the second transmission rod and the length of the third transmission rod are the same.

4. The EMU bogie according to claim 1, wherein, the power steering gear is further provided with a limit switch, which is arranged on a side, facing the power steering swing arm, of the power steering gear, and the limit switch communicates with the controller.

5. The EMU bogie according to claim 4, wherein, the first axletree is sleeved with a first drive axle, and the first drive axle is connected to the first ends of the two side beams; and the second axletree is sleeved with a second drive axle, and the second drive axle is connected to the second ends of the two side beams.

6. The EMU bogie according to claim 5, wherein, two ends of the first axletree are respectively provided with limit stoppers, and the limit stoppers are used for limiting a deflection angle of the first EMU wheel.

7. The EMU bogie according to claim 5, wherein, a middle of the second drive axle is provided with a booster cylinder, which is connected to the other fourth sub-swing arm of the fourth tire steering swing arm.

8. The EMU bogie according to claim 1, wherein, the first included angle, the second included angle, the third included angle and the fourth included angle are different.

9. The EMU bogie according to claim 1, wherein, the length of the power steering drawbar, the length of the first transmission rod, the length of the second transmission rod and the length of the third transmission rod are different.

* * * * *